(12) United States Patent
Kim

(10) Patent No.: US 12,067,193 B2
(45) Date of Patent: Aug. 20, 2024

(54) TOUCH SENSING MODULE AND DISPLAY DEVICE INCLUDING THE SAME

(71) Applicant: Samsung Display Co., LTD., Yongin-si (KR)

(72) Inventor: Chang Bum Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/134,441

(22) Filed: Apr. 13, 2023

(65) Prior Publication Data

US 2024/0069669 A1 Feb. 29, 2024

(30) Foreign Application Priority Data

Aug. 26, 2022 (KR) .................. 10-2022-0107619

(51) Int. Cl.
*G06F 3/041* (2006.01)
*G06F 3/044* (2006.01)
*G06F 3/14* (2006.01)
*G06F 13/42* (2006.01)

(52) U.S. Cl.
CPC .......... *G06F 3/04166* (2019.05); *G06F 3/044* (2013.01); *G06F 3/1446* (2013.01); *G06F 13/4282* (2013.01); *G06F 2203/0382* (2013.01); *G06F 2203/04112* (2013.01)

(58) Field of Classification Search
CPC .... G06F 3/04166; G06F 3/044; G06F 3/1446; G06F 13/4282; G06F 2203/0382; G06F 2203/04112; G06F 3/0412; G06F 3/04164; G09G 3/32; G09G 2320/029; G09G 2300/026
See application file for complete search history.

(56) References Cited

U.S. PATENT DOCUMENTS

| 8,810,543 | B1* | 8/2014 | Kurikawa | ........... G06F 3/04166 345/173 |
| 8,922,539 | B2* | 12/2014 | Choe | .................... G09G 3/3648 345/204 |
| 2009/0251428 | A1* | 10/2009 | Hung | .................. G06F 3/04164 345/173 |

(Continued)

FOREIGN PATENT DOCUMENTS

| KR | 10-2009-0108063 A | 10/2009 |
| KR | 10-2018-0003743 A | 1/2018 |

(Continued)

*Primary Examiner* — Mihir K Rayan
(74) *Attorney, Agent, or Firm* — Lewis Roca Rothgerber Christie LLP

(57) ABSTRACT

A touch sensor includes: a display panel to display an image, and including at least three touch sensing areas; at least one slave processor connected to a second touch sensing area from among the at least three touch sensing areas, and to generate touch coordinate data for the second touch sensing area; and a plurality of master processors connected to first and third touch sensing areas from among the at least three touch sensing areas, and to generate touch coordinate data for the first and third touch sensing areas, respectively. The at least one slave processor is to transmit the touch coordinate data for at least the second touch sensing area to any one of the plurality of master processors, or to another adjacent slave processor.

20 Claims, 15 Drawing Sheets

(56) References Cited

U.S. PATENT DOCUMENTS

| | | | | |
|---|---|---|---|---|
| 2009/0251437 A1* | 10/2009 | Hung | .................. | G06F 3/04166 |
| | | | | 345/174 |
| 2010/0156811 A1* | 6/2010 | Long | .................... | G06F 3/0446 |
| | | | | 345/173 |
| 2011/0242015 A1* | 10/2011 | Lou | ...................... | G06F 3/0416 |
| | | | | 345/173 |
| 2011/0304570 A1* | 12/2011 | Maeda | .................. | G06F 3/0446 |
| | | | | 345/173 |
| 2012/0086681 A1* | 4/2012 | Kim | ..................... | G09G 3/3648 |
| | | | | 345/204 |

FOREIGN PATENT DOCUMENTS

| KR | 10-2250493 B1 | 5/2021 |
|---|---|---|
| KR | 10-2022-0067606 A | 5/2022 |

* cited by examiner

TOUCH SENSING MODULE AND DISPLAY DEVICE INCLUDING THE SAME

CROSS-REFERENCE TO RELATED APPLICATION

This application claims priority to and the benefit of Korean Patent Application No. 10-2022-0107619, filed on Aug. 26, 2022, in the Korean Intellectual Property Office, the entire disclosure of which is incorporated by reference herein.

BACKGROUND

1. Field

Aspects of embodiments of the present disclosure relate to a touch sensing module, and a display device including the touch sensing module.

2. Description of the Related Art

As information-oriented society advances, demand for display devices for displaying images in various ways are increasing. For example, display devices are employed in various electronic devices, such as smartphones, digital cameras, laptop computers, navigation devices, and smart televisions.

The display device may be a flat panel display device, such as a liquid crystal display device, a field emission display device, and an organic light emitting display device. From among the flat panel display devices, in the light emitting display device, because each pixel of a display panel includes a light emitting element capable of emitting light by itself, an image may be displayed without a backlight unit for providing light to the display panel.

Recently, a display device may include a touch sensing module for sensing a user's touch as one of various suitable input interfaces. The touch sensing module includes a touch sensing unit in which touch electrodes are arranged, and a touch driving circuit for detecting a charge amount charged in a capacitance between the touch electrodes. The touch sensing module may be mass-produced while being integrally formed on an image display unit of the display device, or may be mounted on the image display unit.

The above information disclosed in this Background section is for enhancement of understanding of the background of the present disclosure, and therefore, it may contain information that does not constitute prior art.

SUMMARY

One or more embodiments the present disclosure are directed to a touch sensing module, and a display device including the touch sensing module, in which touch coordinate data of a touch sensing unit that is divided into a plurality of areas may be shared by adjacent slave or master processors, and may be transmitted in a cascade method.

One or more embodiments of the present disclosure are directed to a touch sensing module capable of efficiently varying the transmission path for touch coordinate data generated by a slave processor, and a display device including the touch sensing module.

However, the aspects and features of the present disclosure are not limited to those set forth herein. The above and other aspects and features of the present disclosure will become more apparent to those having ordinary skill in the art by referencing the detailed description of the present disclosure below.

According to one or more embodiments of the present disclosure, a touch sensor includes: a display panel configured to display an image, and including at least three touch sensing areas; at least one slave processor connected to a second touch sensing area from among the at least three touch sensing areas, and configured to generate touch coordinate data for the second touch sensing area; and a plurality of master processors connected to first and third touch sensing areas from among the at least three touch sensing areas, and configured to generate touch coordinate data for the first and third touch sensing areas, respectively. The at least one slave processor is configured to transmit the touch coordinate data for at least the second touch sensing area to any one of the plurality of master processors, or to another adjacent slave processor.

In an embodiment, at least one of the plurality of master processors may be configured to sequentially transmit the touch coordinate data received from the at least one slave processor and the touch coordinate data for the first or third touch sensing areas to a display driving circuit according to an order of priority.

In an embodiment, the at least one slave processor may be configured to receive touch coordinate data from another slave processor, and transmit the touch coordinate data received from the another slave processor to the any one of the plurality of master processors, or to the another adjacent slave processor.

In an embodiment, the first, second, and third touch sensing areas may correspond one-to-one to first, second, and third display areas of the display panel, respectively, and a first slave processor from among the at least one slave processor may be configured to generate the touch coordinate data for the second touch sensing area, the second touch sensing area being located between the first and third touch sensing areas from among the at least three touch sensing areas.

In an embodiment, a first master processor from among the plurality of master processors may be configured to generate the touch coordinate data of the first touch sensing area, and transmit the generated touch coordinate data of the first touch sensing area to a display driving circuit, and a second master processor from among the plurality of master processors may be configured to generate the touch coordinate data of the third touch sensing area, and transmit the generated touch coordinate data of the third touch sensing area to the display driving circuit.

In an embodiment, the first slave processor may be configured to transmit the touch coordinate data of the second touch sensing area to one of the first or second master processors according to firmware, and the one of the first or second master processors may be configured to transmit the touch coordinate data received from the first slave processor to the display driving circuit according to an order of priority.

In an embodiment, the first slave processor may be configured to receive an enable signal from any one of the first or second master processors, and transmit the touch coordinate data of the second touch sensing area to the any one of the first or second master processors in response to the enable signal, and the any one of the first or second master processors may be configured to transmit the touch coordinate data received from the first slave processor to the display driving circuit according to an order of priority.

In an embodiment, the first slave processor may be configured to transmit the touch coordinate data of the second touch sensing area to one of the first or second master processors based on the one of the first or second master processors that transmitted touch coordinate data in at least one previous frame period, and the one of the first or second master processors is configured to transmit the touch coordinate data received from the first slave processor to the display driving circuit according to an order of priority.

In an embodiment, the at least three touch sensing areas may further include a fourth touch sensing area, and the first, second, third, and fourth touch sensing areas may correspond one-to-one to first, second, third, and fourth display areas of the display panel, respectively. A first slave processor from among the at least one slave processor may be configured to generate the touch coordinate data for the second touch sensing area, the second touch sensing area being located between the first and fourth touch sensing areas from among the first to fourth touch sensing areas, and a second slave processor from among the at least one slave processor may be configured to generate touch coordinate data for the fourth touch sensing area, the fourth touch sensing area being located between the second and third touch sensing areas among the first to fourth touch sensing areas.

In an embodiment, a first master processor from among the plurality of master processors may be configured to generate the touch coordinate data of the first touch sensing area, and transmit the generated touch coordinate data of the first touch sensing area to a display driving circuit, and a second master processor from among the plurality of master processors may be configured to generate the touch coordinate data of the third touch sensing area, and transmit the generated touch coordinate data of the third touch sensing area to the display driving circuit.

In an embodiment, the first slave processor may be configured to transmit the touch coordinate data of the second touch sensing area to the first master processor or the second slave processor according to a firmware, the second slave processor may be configured to transmit the touch coordinate data of the fourth touch sensing area to the second master processor or the first slave processor according to firmware, and the first and second slave processors may be configured to transmit touch coordinate data received from an adjacent slave processor to one of the first or second master processors according to firmware.

In an embodiment, the first and second master processors may be configured to transmit touch coordinate data sequentially transmitted and received from at least one of the first or second slave processors to the display driving circuit according to an order of priority.

In an embodiment, the first slave processor may be configured to receive an enable signal from any one of the first master processor, the second master processor, or the second slave processor, and transmit the touch coordinate data to the first master processor, the second master processor, or the second slave processor in response to the enable signal from the any one of the first master processor, the second master processor, or the second slave processor. The second slave processor may be configured to receive an enable signal from any one of the first master processor, the second master processor, or the first slave processor, and transmit the touch coordinate data to the first master processor, the second master processor, or the first slave processor in response to the enable signal from the any one of the first master processor, the second master processor, or the first slave processor. The first and second master processors may be configured to transmit the touch coordinate data received from at least one of the first or second slave processors to the display driving circuit according to an order of priority.

In an embodiment, the first slave processor may be configured to transmit the touch coordinate data of the second touch sensing area to the second slave processor, or one of the first or second master processors that transmitted touch coordinate data in at least one previous frame period. The second slave processor may be configured to transmit the touch coordinate data of the fourth touch sensing area to the first slave processor, or one of the first or second master processors that transmitted touch coordinate data in at least one previous frame period. The first and second master processors may be configured to transmit touch coordinate data received from at least one of the first or second slave processors to the display driving circuit according to an order of priority.

In an embodiment, the at least three touch sensing areas may further include fourth and fifth touch sensing areas, the first to fifth touch sensing areas corresponding one-to-one to first, second, third, fourth, and fifth display areas of the display panel, respectively. A first slave processor from among the at least one slave processor may be configured to generate the touch coordinate data for the second touch sensing area, the second touch sensing area being located between the first and fourth touch sensing areas from among the first to fifth touch sensing areas. A second slave processor from among the at least one slave processor may be configured to generate touch coordinate data for the fourth touch sensing area, the fourth touch sensing area being located between the second and fifth touch sensing areas from among the first to fifth touch sensing areas. A third slave processor from among the at least one slave processor may be configured to generate touch coordinate data for the fifth touch sensing area, the fifth touch sensing area being located between the fourth and third touch sensing areas among the first to fifth touch sensing areas.

In an embodiment, a first master processor from among the plurality of master processors may be configured to generate the touch coordinate data of the first touch sensing area, and transmit the generated touch coordinate data of the first touch sensing area to a display driving circuit, and a second master processor from among the plurality of master processors may be configured to generate the touch coordinate data of the third touch sensing area, and transmit the generated touch coordinate data of the third touch sensing area to the display driving circuit.

In an embodiment, the first slave processor may be configured to transmit the touch coordinate data of the second touch sensing area to the first master processor or the second slave processor according to a firmware, the second slave processor may be configured to transmit the touch coordinate data of the fourth touch sensing area to the first slave processor or the third slave processor according to a firmware, the third slave processor may be configured to transmit the touch coordinate data of the fifth touch sensing area to the second master processor or the second slave processor according to firmware, and the first to third slave processors may be configured to transmit touch coordinate data received from an adjacent slave processor to another adjacent slave processor, or one of the first or second master processors according to firmware.

In an embodiment, the first and second master processors may be configured to transmit the touch coordinate data sequentially transmitted and received from at least one of the first or second slave processors to the display driving circuit according to an order of priority.

In an embodiment, the first slave processor may be configured to receive an enable signal from the first master processor or the second slave processor, and transmit the touch coordinate data to the second slave processor or the first master processor according to the enable signal from the first master processor or the second slave processor. The second slave processor may be configured to receive an enable signal from any one of the first or third slave processors, and transmit the touch coordinate data to the any one of the first or third slave processors according to the enable signal from the any one of the first or third slave processors. The third slave processor may be configured to receive an enable signal from the second slave processor or the second master processor, and transmit the touch coordinate data to the second master processor or the second slave processor according to the enable signal from the second slave processor or the second master processor. The first and second master processors may be configured to transmit touch coordinate data received from at least one of the first to third slave processors to the display driving circuit according to an order of priority.

According to one or more embodiments of the present disclosure, a display device includes: a display panel including at least three display areas on a substrate; a display driving circuit configured to drive sub-pixels included in the at least three display areas to display an image; and a touch sensor at a front face of the display panel, and including at least three touch sensing areas to detect a touch. The touch sensor includes: at least one slave processor connected to one of the at least three touch sensing areas, and configured to generate touch coordinate data for the one of the at least three touch sensing areas; and a plurality of master processors connected to two of the at least three touch sensing areas other than the one of the at least three touch sensing areas connected to the at least one slave processor, and configured to generate touch coordinate data for the two of the at least three touch sensing areas, respectively. The at least one slave processor is configured to transmit the touch coordinate data for at least the one of the at least three touch sensing areas to any one of the plurality of master processors, and the plurality of master processors are configured to sequentially transmit the touch coordinate data received from the at least one slave processor and the touch coordinate data for the two of the at least three touch sensing areas to the display driving circuit.

According to one or more embodiments of the present disclosure, touch coordinate data may be shared by and transmitted between adjacent slave or master processors. Thus, manufacturing specifications of the processors may be efficiently managed.

According to one or more embodiments of the present disclosure, by efficiently varying the transmission path for the touch coordinate data generated by the slave processor, it may be possible to level the manufacturing specifications of the slave or master processors, and reduce the manufacturing costs of the touch sensing module and the display device.

However, the aspects and features of the present disclosure are not limited to those described above, and various other aspects and features may be included in the present disclosure as set forth, in part, in the description that follows, and in part, may be apparent from the description, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
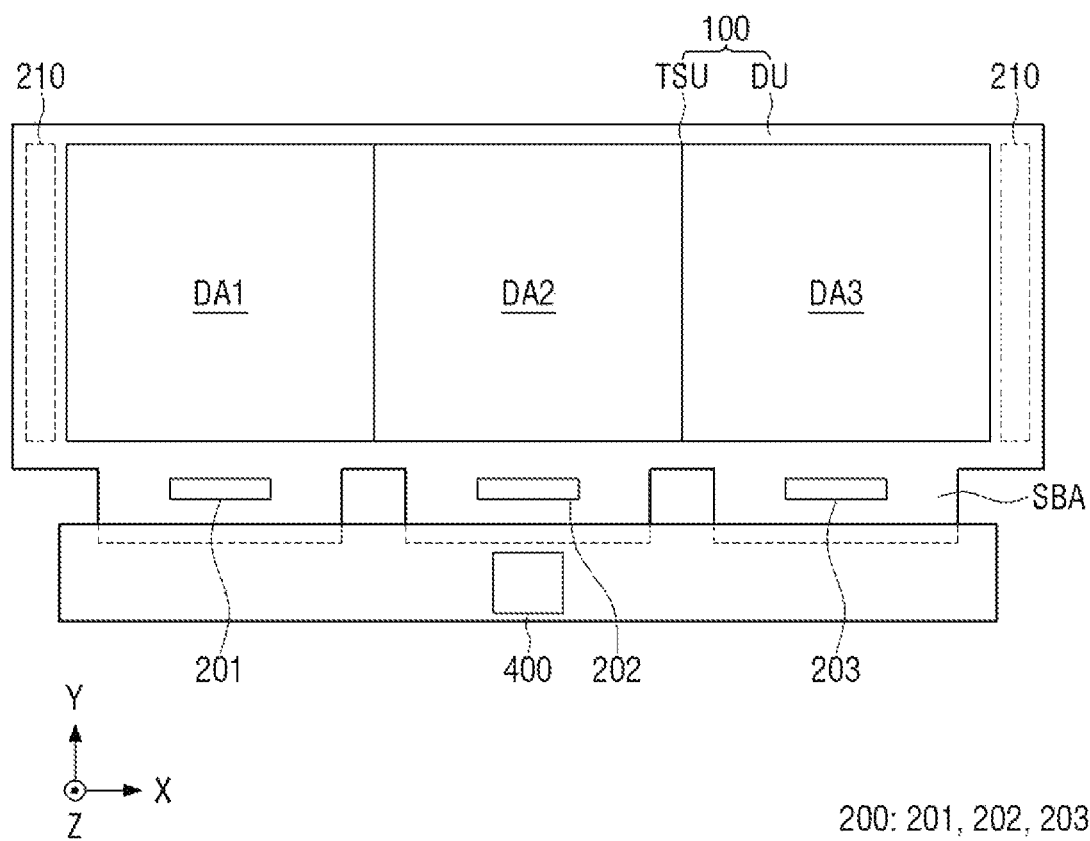
FIG. 1 is a plan view illustrating a configuration of a display device according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure (e.g., the processors 201, 202, and 203) described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
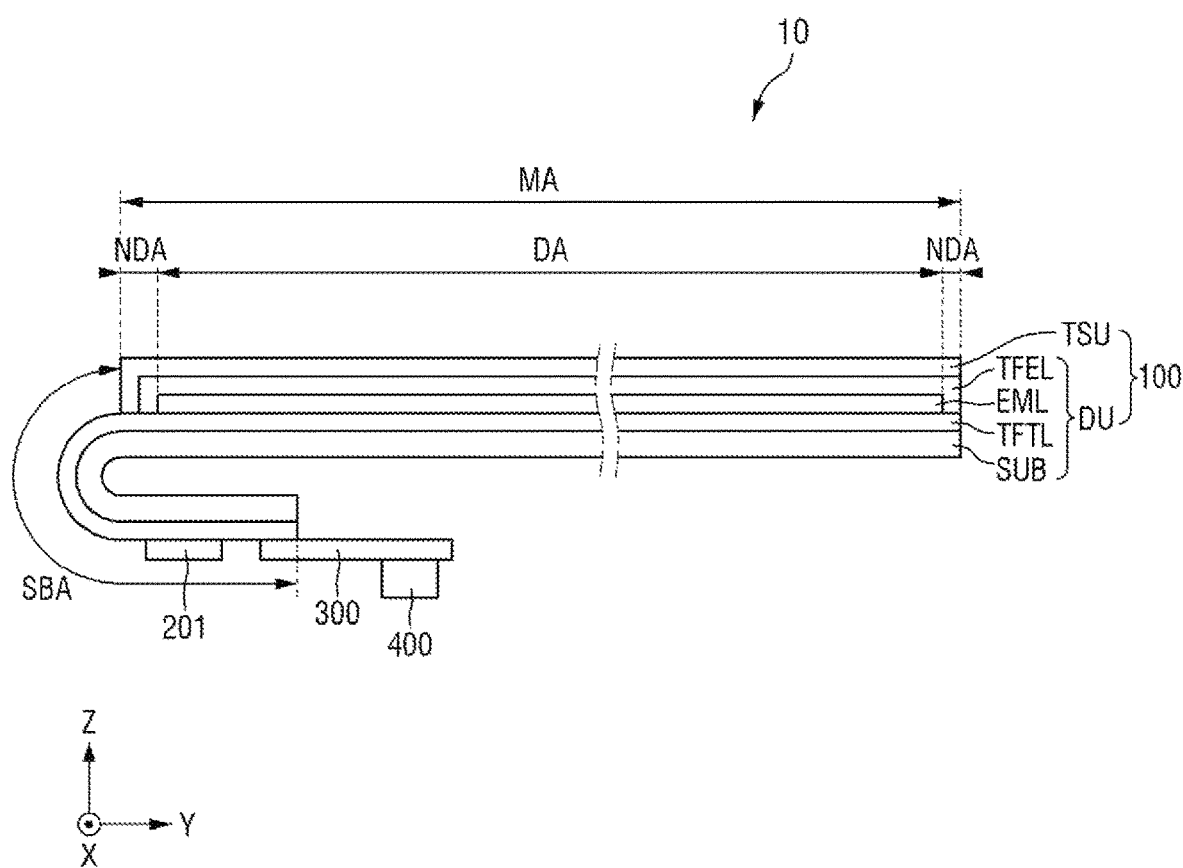
FIG. 2 is a cross-sectional view illustrating one-side of the display device illustrated in FIG. 1.

FIG. 1 is a plan view illustrating a configuration of a display device according to an embodiment. FIG. 2 is a cross-sectional view illustrating one-side of the display device illustrated in FIG. 1.

Referring to FIGS. 1 and 2, a display device 10 according to an embodiment may be classified in various suitable ways according to a display method. For example, the display device 10 may be classified into an organic light emitting display (OLED) device, an inorganic light emitting display (inorganic EL) device, a quantum dot light emitting display (QED) device, a micro-LED display device, a nano-LED display device, a plasma display device (PDP), a field emission display (FED) device, a liquid crystal display (LCD) device, an electrophoretic display (EPD) device, and/or the like. Hereinafter, for convenience, the display device 10 may be described in more detail in the context of the organic light emitting display device (OLED), but the present disclosure is not limited thereto. The display device 10 is not limited to the OLED device, and other suitable kinds of display devices, such as those described above or those known to one having ordinary skill in the art may be used as the display device 10, without departing from the spirit and scope of the present disclosure.

The display device 10 according to an embodiment may be applied to a dashboard of a vehicle, a center fascia of a vehicle, a center information display (CID) disposed on a dashboard of a vehicle, and/or a room mirror display device in place of one or more side mirrors of a vehicle. The display device 10 that is used in a vehicle may include a large screen display panel 100 that displays instrument information of an instrument panel, operation information of electronic devices, navigation images, camera images, sensing information, and/or the like on a single screen.

The display device 10 according to an embodiment may be applied to various suitable portable electronic devices, such as a mobile phone, a smartphone, a tablet personal computer, a mobile communication terminal, an electronic organizer, an electronic book, a portable multimedia player (PMP), a navigation system, an ultra mobile PC (UMPC), and/or the like. For example, the display device 10 may be applied as a display unit (e.g., a display or a display screen) of a television, a laptop, a monitor, a billboard, and/or an Internet-of-Things (IoT) device. As another example, the display device 10 may be applied to various suitable wearable devices, such as a smart watch, a watch phone, a glasses type display, and/or a head mounted display (HMD).

The display device 10 according to an embodiment may be formed to have at least one of a rectangular shape, a square shape, a circular shape, or an oval shape in a plan view. For example, when the display device 10 is used in a vehicle, the display device 10 may be formed in a rectangular shape with vertically arranged short sides and horizontally arranged long sides. A planar structure of the display device 10 is not limited thereto, and the display device 10 may be formed in a rectangular shape with vertically arranged long sides, or may be installed to be rotatable, such that the position of the long sides is switchable between the vertical direction and the horizontal direction.

As shown in FIGS. 1 and 2, the display device 10 includes a display panel 100. The display device 10 includes a touch sensing module (e.g., a touch sensor), which includes a touch sensing unit (e.g., a touch sensing layer or a touch sensing panel) TSU arranged at (e.g., placed on) the front of the display panel 100, and a touch driving circuit 200 that generates touch coordinate data of the touch sensing unit TSU.

In more detail, the display panel 100 of the display device 10 includes a display unit (e.g., a display layer) DU for displaying an image, and the touch sensing unit TSU for sensing a touch of a body part such as a finger, and a touch input device such as an electronic pen may be disposed on the display panel 100.

The display unit DU of the display panel 100 may be divided (e.g., previously divided) into at least three display areas DA1, DA2, and DA3. Each of the divided display areas DA1, DA2, and DA3 may include a plurality of pixels through which an image may be displayed. For example, each pixel may include red, green, and blue sub-pixels, or may include red, green, blue, and white sub-pixels.

The touch sensing unit TSU may be mounted to the front side of the display panel 100, or may be integrally formed with the display panel 100 on the front face thereof. The touch sensing unit TSU may include a plurality of touch electrodes to sense a user's touch in a capacitive manner using the touch electrodes.

The touch sensing unit TSU may be divided to correspond to the divided display areas DA1, DA2, and DA3. The divided touch sensing unit TSU may be mounted to the front of the display areas DA1, DA2, and DA3, or may be integrally formed with the display areas DA1, DA2, and DA3, respectively. For example, the touch sensing unit TSU may be divided into first to third touch sensing areas corresponding one-to-one with the first to third display areas DA1, DA2, and DA3, respectively.

The touch driving circuit 200 includes a plurality of processors 201, 202, and 203 electrically connected to the touch sensing unit TSU, or in other words, to the touch sensing areas. Each of the processors 201, 202, and 203 may supply touch driving signals to the touch electrodes arranged in a matrix structure in each corresponding touch sensing area, and may sense a change in capacitance between the touch electrodes. Each of the processors 201, 202, and 203 may determine a user's touch input based on an amount of change in the capacitance between the touch electrodes, and may calculate the touch coordinate data. The touch driving circuit 200 including the processors 201, 202, and 203, and the touch sensing unit TSU divided into the respective touch sensing areas will be described in more detail below with reference to some of the other figures.

A display driving circuit 400 may output signals and voltages for driving the pixels of the display unit DU, or in other words, for driving the sub-pixels of the first to third display areas DA1, DA2, and DA3 that are separated (e.g., divided) from each other. The display driving circuit 400 may supply data voltages to data lines through which the sub-pixels are connected. The display driving circuit 400 may supply a power voltage to a power line, and may supply gate control signals to at least one gate driver 210. The display driving circuit 400 may be divided into a timing controller that performs a timing control function, and a data driver that supplies the data voltages to the data lines. In this case, the display driving circuit 400 may control the driving timing of the gate driver 210 and the data driver, by supplying the timing control signal to the gate driver (e.g., to at least one gate driver) 210 and the data driver.

The display driving circuit 400 may control an overall function of the display device 10. For example, the display driving circuit 400 may receive the touch coordinate data of the touch sensing areas from the processors 201, 202, and 203 to determine the user's touch coordinates, and may generate digital video data according to the touch coordinates. In addition, the display driving circuit 400 may execute an application indicated by an icon displayed at (e.g., in or on) the user's touch coordinates. As another example, the display driving circuit 400 may receive coordinate data from an electronic pen or the like, determine touch coordinates of the electronic pen, and generate digital video data according to the touch coordinates, or execute an application indicated by an icon displayed at (e.g., in or on) the touch coordinates of the electronic pen.

Referring to FIG. 2, the display panel 100 may be divided into a main region MA and a sub-region SBA. The main region MA may include a display area DA (e.g., including the display areas DA1, DA2, and DA3 equipped with the sub-pixels) for displaying an image, and a non-display area NDA disposed around (e.g., to surround around a periphery of) the display area DA (e.g., the display areas DA1, DA2, and DA3). In each of the display areas DA1, DA2, and DA3, light may be emitted from emission areas or opening areas of the individual sub-pixels to display an image. The sub-pixels arranged at (e.g., in or on) each of the display areas DA1, DA2, and DA3 may include a pixel circuit including switching elements, a pixel defining layer defining an emission area or an opening area, and a self-light emitting element.

The non-display area NDA may be an area around (e.g., surrounding a periphery of) the display areas DA1, DA2, and DA3, or in other words, may be an area outside the display areas DA1, DA2, and DA3. The non-display area NDA may be defined as an edge area of the main region MA corresponding to the display areas DA1, DA2, and DA3 of the display panel 100. The non-display area NDA may include at least one gate driver 210 that supplies gate signals to the gate lines, and fan-out lines that connect the display driving circuit 400 to the display area DA.

The sub-region SBA may extend from one side of the main region MA. The sub-region SBA may include a flexible material that may be bent, folded, or rolled. For example, when the sub-region SBA is bent, the sub-region SBA may overlap with the main region MA in a thickness direction (e.g., the Z-axis direction). The sub-region SBA may include the display driving circuit 400, and a pad unit (e.g., a pad or a terminal pad) connected to a circuit board 300. As another example, the sub-region SBA may be omitted as needed or desired, and the display driving circuit 400 and the pad unit may be arranged at (e.g., in or on) the non-display area NDA.

The circuit board 300 may be attached to the pad unit of the display panel 100 by using an anisotropic conductive film (ACF). Lead lines of the circuit board 300 may be electrically connected to the pad unit of the display panel 100. The circuit board 300 may be a flexible printed circuit board, a printed circuit board, or a flexible film, such as a chip on film.

A substrate SUB of the display panel 100 illustrated in FIG. 2 may be a base substrate or a base member. The substrate SUB may be of a flat or substantially flat type. As another example, the substrate SUB may be a flexible substrate, which may be bent, folded, or rolled. For example, the substrate SUB may include a glass material or a metal material, but is not limited thereto. For another example, the substrate SUB may include a polymer resin, such as polyimide (PI).

A thin film transistor layer TFTL may be disposed on the substrate SUB. The thin film transistor layer TFTL may include a plurality of thin film transistors constituting a pixel circuit of each of the sub-pixels. The thin film transistor layer TFTL may further include gate lines, data lines, power lines, gate control lines, fan-out lines that connect the display driving circuit 400 to the data lines, and lead lines that connect the display driving circuit 400 to the pad unit. When the gate driver 210 is formed on opposite sides (e.g., one side and another side) of the non-display area NDA of the display panel 100, respectively, each gate driver 210 may also include thin film transistors.

The thin film transistor layer TFTL may be selectively disposed at (e.g., in or on) each of the display areas DA1, DA2, and DA3, the non-display area NDA, and the sub-region SBA. Thin film transistors, gate lines, data lines, and power lines of each of the pixels of the thin film transistor layer TFTL may be disposed at (e.g., in or on) each of the display areas DA1, DA2, and DA3. Gate control lines and fan-out lines of the thin film transistor layer TFTL may be disposed at (e.g., in or on) the non-display area NDA. The lead lines of the thin film transistor layer TFTL may be disposed at (e.g., in or on) the sub-region SBA.

A light emitting element layer EML may be disposed on the thin film transistor layer TFTL. The light emitting element layer EML may include a plurality of light emitting elements in which a first electrode, a light emitting layer, and a second electrode are sequentially stacked to emit light, and a pixel defining layer defining each sub-pixel. The light emitting elements of the light emitting element layer EML may be disposed at (e.g., in or on) the display area DA.

An encapsulation layer TFEL may cover a top surface and a side surface of the light emitting element layer EML, and may protect the light emitting element layer EML. The encapsulation layer TFEL may include at least one inorganic layer, and at least one organic layer for encapsulating the light emitting element layer EML.

The touch sensing unit TSU that is divided into the plurality of touch sensing areas may be disposed on the encapsulation layer TFEL of the display panel 100. Each touch sensing area may include a plurality of first touch electrodes for sensing a user's touch in a capacitive manner, and touch driving lines connecting the plurality of first touch electrodes to each of the processors 201, 202, and 203. In each touch sensing area, the first touch electrodes are arranged in a matrix structure to sense a user's touch by a self-capacitance method or a mutual capacitance method.

The touch sensing unit TSU may not be integrally formed on the display panel 100, and may be disposed on a separate substrate or film that is disposed on the display unit DU of the display panel 100. In this case, the substrate or film for supporting the touch sensing unit TSU may be a base member that encapsulates the display unit DU. Hereinafter, for convenience, an example in which the touch sensing unit TSU is integrally formed on the front face of the display unit DU will be described in more detail.

A plurality of touch electrodes may be disposed at (e.g., in or on) each of the touch sensing areas overlapping with the display areas DA1, DA2, and DA3, respectively. Touch lines for transmitting touch driving signals or touch sensing signals may be disposed at (e.g., in or on) a touch peripheral area overlapping with the non-display area NDA.

Each of the processors 201, 202, and 203 that generate touch coordinate data for each corresponding touch sensing area may be disposed at (e.g., in or on) the sub-region SBA or the non-display area NDA of the display panel 100. As another example, each of the processors 201, 202, and 203 that generate the touch coordinate data may be mounted on the circuit board 300. Each of the processors 201, 202, and 203 may be formed in the form of an integrated circuit IC.

Each of the processors 201, 202, and 203 supplies touch driving signals to the touch electrodes for each of the touch sensing areas overlapping with the display areas DA1, DA2, and DA3, respectively, and measures a charge variation in a mutual capacitance of each of a plurality of touch nodes formed by the first touch electrodes. In this case, each of the processors 201, 202, and 203 measures a change in capacitance of the touch nodes according to a change in a voltage magnitude or a current amount of a touch sensing signal received through the touch electrodes. Each of the processors 201, 202, and 203 may determine the user's touch position according to a charge variation in the mutual capacitance of each of the touch nodes. Here, the touch driving signal may be a pulse signal having a suitable frequency (e.g., a predetermined frequency). Each of the processors 201, 202, and 203 determines whether or not a touch input is made by a touch input device or the user's body part, such as a finger, based on the variation in the capacitance between the touch electrodes for each touch sensing area, and calculates the touch coordinates.

Figure 3:
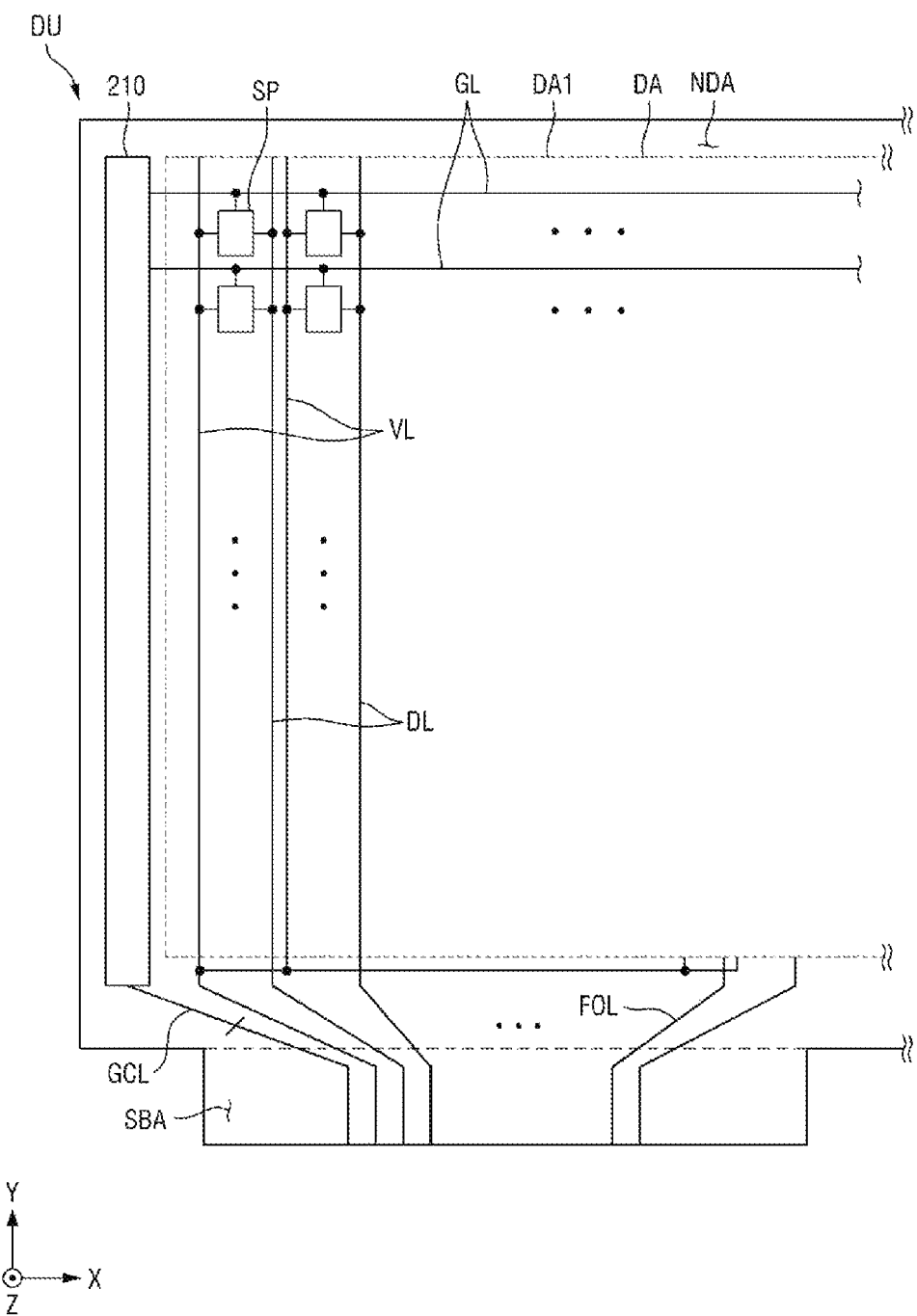
FIG. 3 is a layout diagram schematically illustrating a display panel according to an embodiment.

FIG. 3 is a layout diagram schematically illustrating a display panel according to an embodiment. In more detail, FIG. 3 is a layout diagram partially illustrating a state of the first display area DA1 of the display unit DU and the non-display area NDA around the first display area DA1 before the touch sensing unit TSU is formed.

Each of the display areas DA1, DA2, and DA3 including the first display area DA1 is an area for displaying an image, and collectively, may be defined as a central area of the display panel 100. For example, the first display area DA1 may include a plurality of sub-pixels SP, a plurality of gate lines GL, a plurality of data lines DL, a plurality of power lines VL, and the like. Each of the plurality of sub-pixels SP may be defined as the smallest unit that outputs light.

The plurality of gate lines GL may supply the gate signals received from the gate driver 210 to the plurality of sub-pixels SP. The plurality of gate lines GL may extend in the X-axis direction, and may be spaced apart from each other along the Y-axis direction that crosses the X-axis direction.

The plurality of data lines DL may supply the data voltages received from the display driving circuit 400 to the plurality of sub-pixels SP. The plurality of data lines DL may extend in the Y-axis direction, and may be spaced apart from each other along the X-axis direction.

The plurality of power lines VL may supply the power voltage received from the display driving circuit 400 to the plurality of sub-pixels SP. The power voltage may be at least one of a driving voltage, an initialization voltage, or a reference voltage. The plurality of power lines VL may extend in the Y-axis direction, and may be spaced apart from each other along the X-axis direction.

The non-display area NDA may surround (e.g., around a periphery of) the second and third display areas DA2 and DA3, as well as the first display area DA1. The non-display area NDA may include a gate driver 210, fan-out lines FOL, and gate control lines GCL. The gate driver 210 may generate a plurality of gate signals based on the gate control signal, and may sequentially supply the plurality of gate signals to the plurality of gate lines GL according to a suitable order (e.g., a set or predetermined order).

The fan-out lines FOL may extend from the display driving circuit 400 to each of the display areas DA1, DA2, and DA3. The fan-out lines FOL may supply the data voltage received from the display driving circuit 400 to the plurality of data lines DL.

The gate control line GCL may extend from the display driving circuit 400 to the gate driver 210. The gate control line GCL may supply the gate control signal received from the display driving circuit 400 to the gate driver 210.

The display driving circuit 400 may output signals and voltages for driving the display panel 100 to the fan-out lines FOL. The display driving circuit 400 may supply a data voltage to the data line DL through the fan-out lines FOL. The data voltage may be supplied to the plurality of sub-pixels SP to determine a luminance of the plurality of sub-pixels SP. The display driving circuit 400 may supply the gate control signal to the gate driver 210 through the gate control line GCL.

Figure 4:
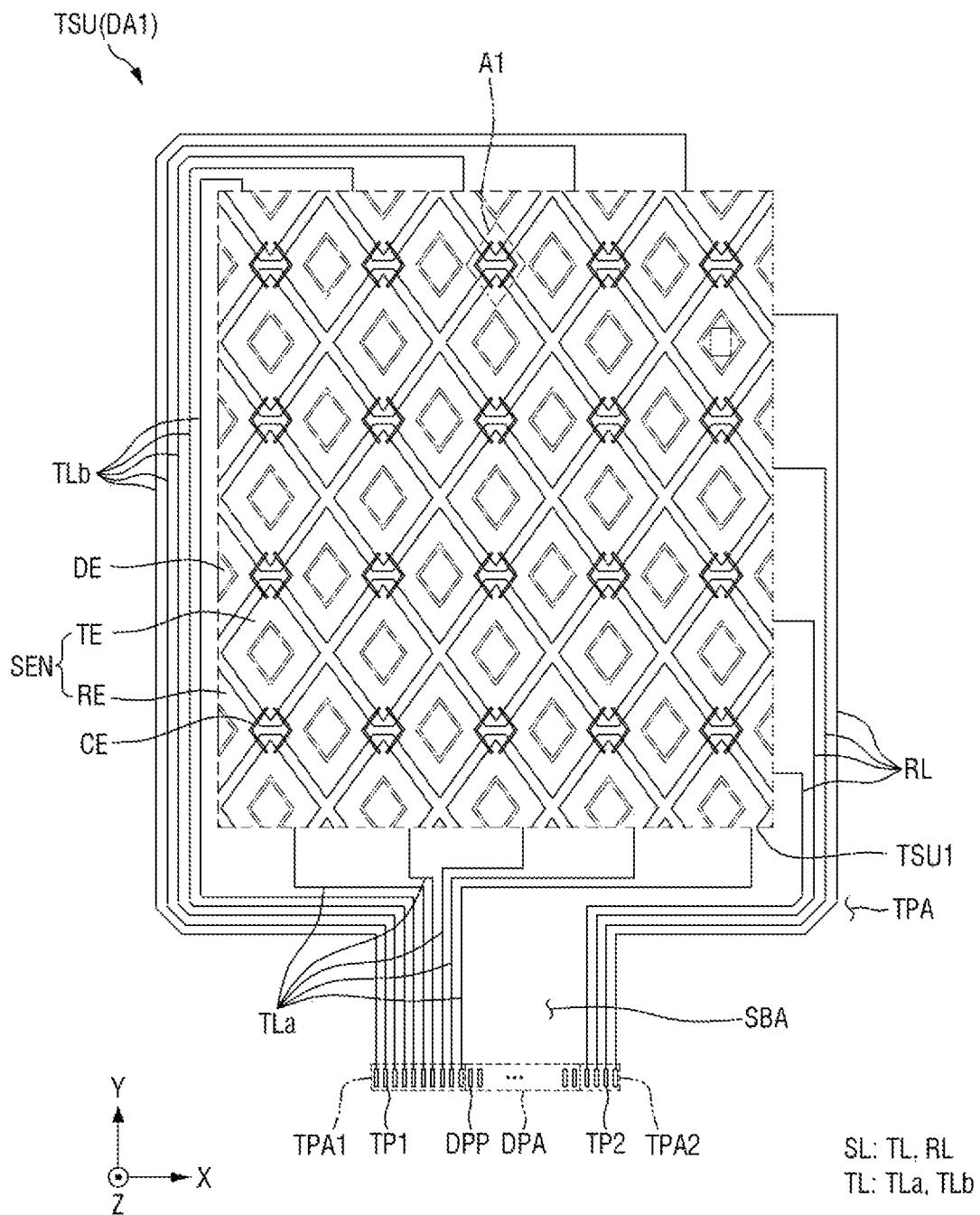
FIG. 4 is a layout diagram schematically illustrating a touch sensing module according to an embodiment.

FIG. 4 is a layout diagram schematically illustrating a touch sensing module according to an embodiment. In more detail, FIG. 4 is a layout diagram illustrating a planar structure of a first touch sensing area TSU1 corresponding to the first display area DA1.

Referring to FIG. 4, the touch sensing unit TSU may include at least one touch sensing area TSU1 for sensing a user's touch, and a touch peripheral area TPA disposed around (e.g., to surround around a periphery of) the touch sensing area TSU1. For example, a first touch sensing area TSU1 may overlap with the first display area DA1 of the display unit DU, and the touch peripheral area TPA may overlap with the non-display area NDA of the display unit DU.

At least one touch sensing area, for example, such as the first touch sensing area TSU1, may include a plurality of touch electrodes SEN, and a plurality of dummy electrodes DE. The plurality of touch electrodes SEN may form a mutual capacitance or a self-capacitance to sense a touch of an object or a person. The plurality of touch electrodes SEN may include a plurality of driving electrodes TE, and a plurality of sensing electrodes RE.

The plurality of driving electrodes TE may be arranged in the X-axis direction and the Y-axis direction. The plurality of driving electrodes TE may be spaced apart from each other along the X-axis direction and the Y-axis direction. The driving electrodes TE that are adjacent to each other in the Y-axis direction may be electrically connected to each other through a plurality of connection electrodes CE.

The plurality of driving electrodes TE may be connected to first touch pads TP1 through a driving line TL. The driving line TL may include a lower driving line TLa and an upper driving line TLb. For example, some of the driving electrodes TE disposed on a lower side the first touch sensing area TSU1 may be connected to the first touch pads TP1 through the lower driving line TLa, and some others of the driving electrodes TE disposed on an upper side of the first touch sensing area TSU1 may be connected to the first touch pads TP1 through the upper driving line TLb. The lower driving line TLa may extend to the first touch pads TP1 through the lower side of the touch peripheral area TPA. The upper driving line TLb may extend to the first touch pads TP1 through the upper side, the left side, and the lower side of the touch peripheral area TPA. The first touch pads TP1 may be connected to a processor 201 (e.g., any suitable one of the processors 200) through the circuit board 300.

The connection electrode CE may be bent at least once. For example, the connection electrode CE may have an angle bracket shape (e.g., "<" shape or ">" shape), but the planar shape of the connection electrode CE is not limited thereto. The driving electrodes TE that are adjacent to each other in the Y-axis direction may be electrically connected to each other by a plurality of connection electrodes CE, and thus, even if any one of the connection electrodes CE is disconnected, the driving electrodes TE may be stably connected to each other through the other (e.g., the remaining) connection electrode CE. The driving electrodes TE that are adjacent to each other may be connected to each other by two connection electrodes CE, but the number of connection electrodes CE is not limited thereto.

The connection electrode CE may be disposed at (e.g., in or on) a different layer from that of the plurality of driving electrodes TE and the plurality of sensing electrodes RE. The sensing electrodes RE that are adjacent to each other in the X-axis direction may be electrically connected to each other through a connection portion disposed at (e.g., in or on) the same layer as that of the plurality of driving electrodes TE or the plurality of sensing electrodes RE. In other words, the plurality of sensing electrodes RE may extend in the X-axis direction, and may be spaced apart from each other along the Y-axis direction. The plurality of sensing electrodes RE may be arranged in the X-axis direction and the Y-axis direction, and the sensing electrodes RE that are adjacent to each other in the X-axis direction may be electrically connected to each other through the connection portion.

The driving electrodes TE that are adjacent to each other in the Y-axis direction may be electrically connected to each other through the connection electrodes CE disposed at (e.g., in or on) a layer different from that of the plurality of driving electrodes TE or the plurality of sensing electrodes RE. The connection electrodes CE may be formed at (e.g., in or on) a rear layer (e.g., a lower layer) of a layer at (e.g., in or on) which the driving electrodes TE and the sensing electrodes RE are formed. The connection electrodes CE are electrically connected to adjacent ones of the driving electrodes TE through a plurality of contact holes. Accordingly, although the connection electrodes CE overlap with the plurality of sensing electrodes RE in the Z-axis direction, the plurality of driving electrodes TE and the plurality of sensing electrodes RE may be insulated from each other. A mutual capacitance may be formed between the driving electrode TE and the sensing electrode RE.

The plurality of sensing electrodes RE may be connected to second touch pads TP2 through a sensing line RL. For example, some of the sensing electrodes RE disposed on the right side of the first touch sensing area TSU1 may be connected to the second touch pads TP2 through the sensing line RL. The sensing line RL may extend to the second touch pads TP2 through the right side and the lower side of the touch peripheral area TPA. The second touch pads TP2 may be connected to the processor 201 (e.g., any suitable one of the processors 200) through the circuit board 300.

Each of the plurality of dummy electrodes DE may be surrounded (e.g., around a periphery thereof) by a corresponding one of the driving electrodes TE, or a corresponding one of the sensing electrodes RE. Each of the dummy electrodes DE may be insulated from the corresponding one of the driving electrodes TE or the corresponding one of the sensing electrodes RE by being spaced apart from the corresponding one of the driving electrodes TE or the corresponding one of the sensing electrodes RE. Accordingly, the dummy electrode DE may be electrically floating.

A display pad area DPA, the first touch pad area TPA1, and the second touch pad area TPA2 may be disposed at an edge of the sub-region SBA. The display pad area DPA, the first touch pad area TPA1, and the second touch pad area TPA2 may be electrically connected to the circuit board 300 by using an anisotropic conductive layer or a low-resistance high-reliability material, such as SAP.

The first touch pad area TPA1 may be disposed on one side of the display pad area DPA, and may include the plurality of first touch pads TP1. The plurality of first touch pads TP1 may be electrically connected to the processor 201 (e.g., any one of the processors 200), which may be disposed on the circuit board 300. The plurality of first touch pads TP1 may supply a touch driving signal to the plurality of driving electrodes TE through the plurality of driving lines TL.

The second touch pad area TPA2 may be disposed on another side of the display pad area DPA, and may include the plurality of second touch pads TP2. The plurality of second touch pads TP2 may be electrically connected to the processor 201 (e.g., any one of the processors 200), which may be disposed on the circuit board 300. The processor 201 (e.g., any one of the processors 200) may receive a touch sensing signal through the plurality of sensing lines RL connected to the plurality of second touch pads TP2, and may sense a change in the mutual capacitance between the driving electrode TE and the sensing electrode RE.

As another example, the processor 201 (e.g., any one of the processors 200) may supply a touch driving signal to each of the plurality of driving electrodes TE and the plurality of sensing electrodes RE, and may receive a touch sensing signal from each of the plurality of driving electrodes TE and the plurality of sensing electrodes RE. The processor 201 (e.g., any one of the processors 200) may sense an amount of change in an electric charge of each of the plurality of driving electrodes TE and the plurality of sensing electrodes RE based on the touch sensing signal.

Figure 5:
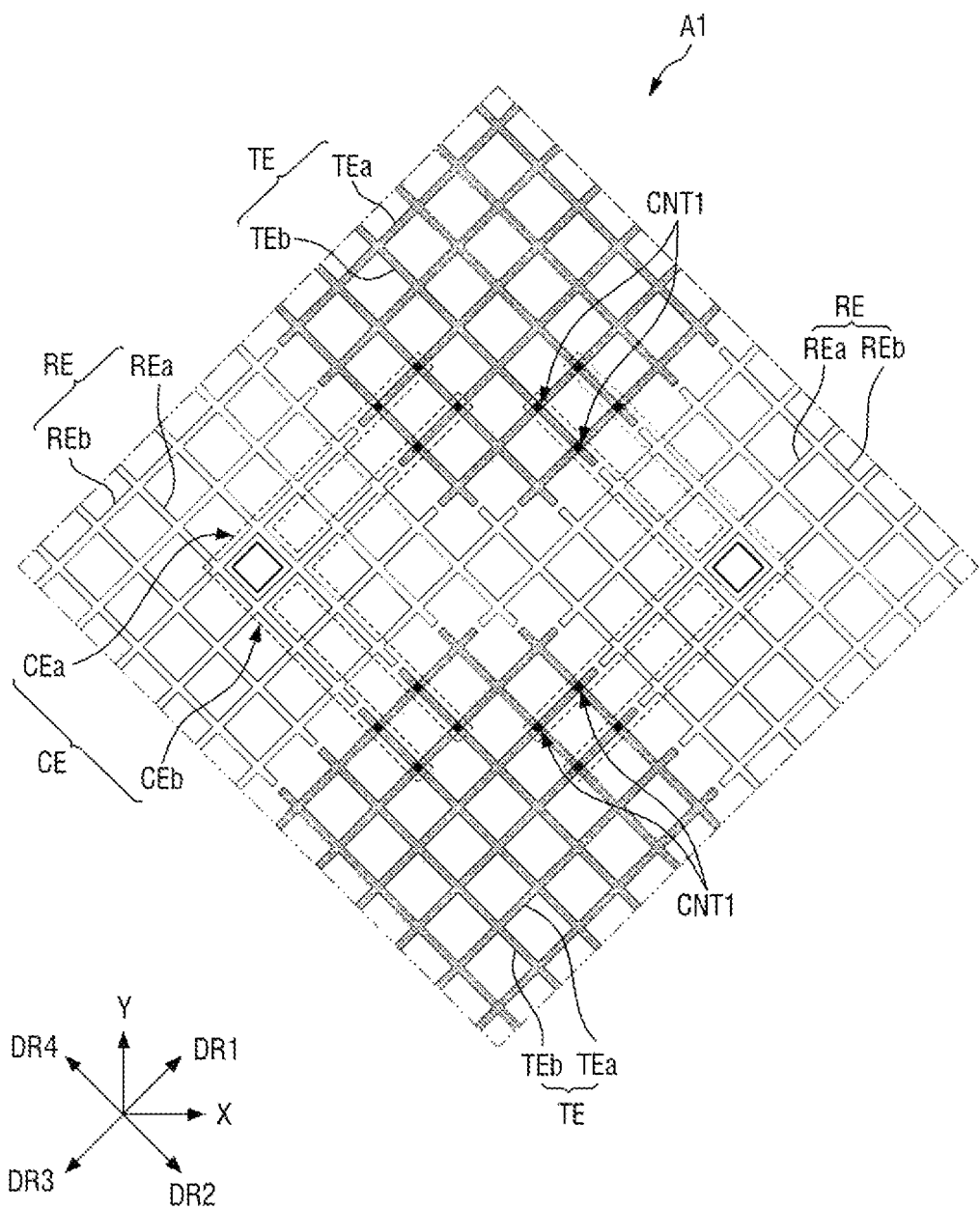
FIG. 5 is an enlarged view of the area A1 illustrated in FIG. 4.
Figure 6:
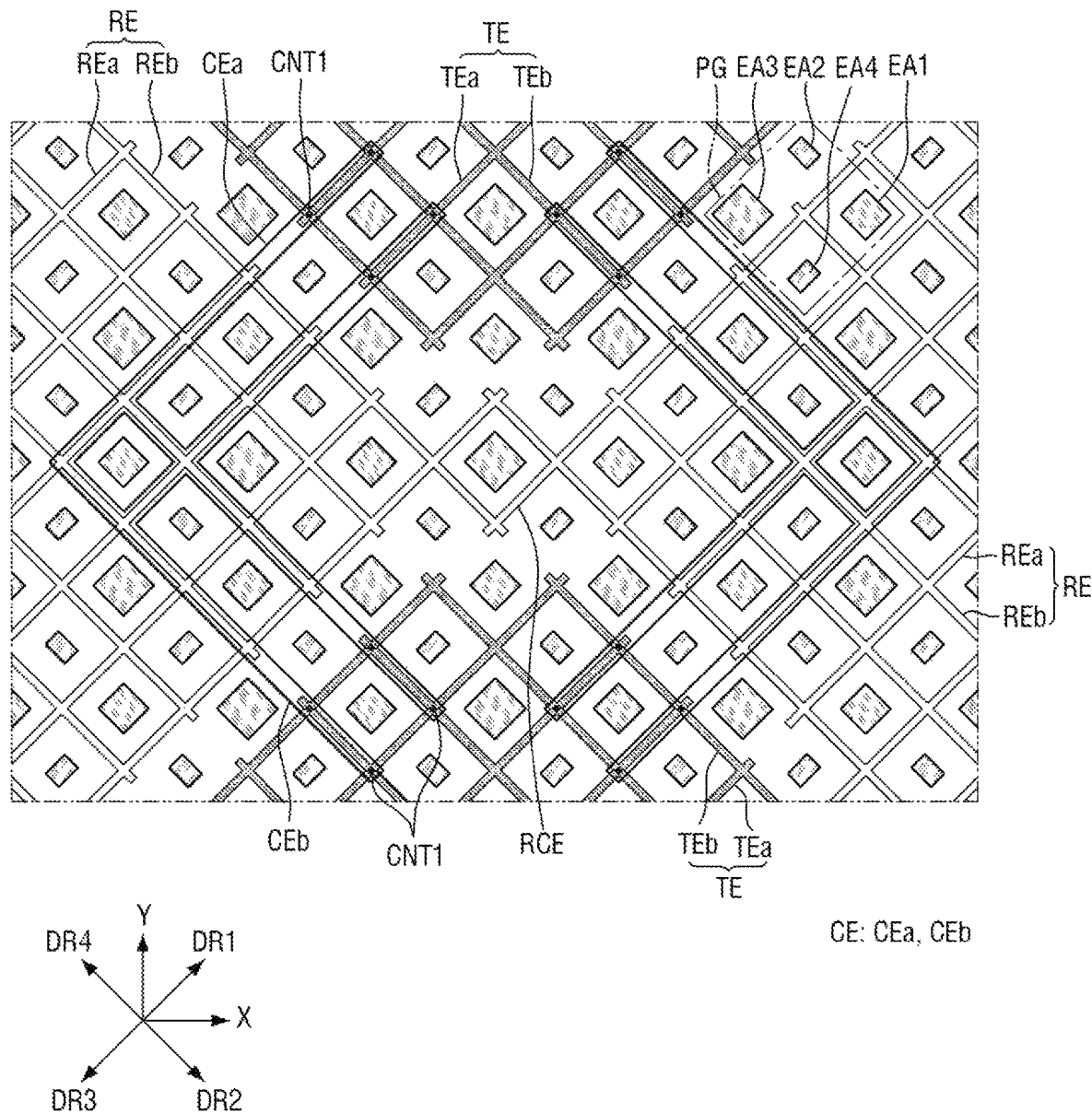
FIG. 6 is an enlarged view illustrating a connection structure between the connection electrode and the sensing electrodes illustrated in FIG. 5.

FIG. 5 is an enlarged view of the area A1 illustrated in FIG. 4. FIG. 6 is an enlarged view illustrating a connection structure between the connection electrode and the sensing electrodes illustrated in FIG. 5.

Referring to FIGS. 5 and 6, the plurality of driving electrodes TE, the plurality of sensing electrodes RE, and the plurality of dummy electrodes DE may be disposed at (e.g., in or on) the same layer as each other, and may be spaced apart from one another.

The plurality of driving electrodes TE may be arranged in the X-axis direction and the Y-axis direction. The plurality of driving electrodes TE may be spaced apart from each other along the X-axis direction and the Y-axis direction. The driving electrodes TE that are adjacent to each other in the Y-axis direction may be electrically connected to each other through the connection electrode CE.

The plurality of sensing electrodes RE may extend in the X-axis direction, and may be spaced apart from each other along the Y-axis direction. The plurality of sensing electrodes RE may be arranged in the X-axis direction and the Y-axis direction, and the sensing electrodes RE that are adjacent to each other in the X-axis direction may be electrically connected to each other. For example, the sensing electrodes RE may be electrically connected to each other through the connection portion, and the connection portion may be disposed within the shortest distance between the driving electrodes TE that are adjacent to each other.

The plurality of connection electrodes CE may be disposed at (e.g., in or on) a different layer from that of the driving electrode TE and the sensing electrode RE. For example, the plurality of connection electrodes CE may be disposed at (e.g., in or on) a rear surface layer with respect to that of the driving electrode TE and the sensing electrode RE. The connection electrode CE may include a first portion CEa and a second portion CEb. For example, the first portion CEa of the connection electrode CE may be connected to the driving electrode TE disposed on one side (e.g., at one end) thereof through a first contact hole CNT1, and may extend in a third direction DR3. The second portion CEb of the connection electrode CE may be bent from the first portion CEa at (e.g., in or on) an area overlapping with the sensing electrode RE to extend in a second direction DR2, and may be connected to the driving electrode TE disposed on another side (e.g., another end) thereof through the first contact hole CNT1. Hereinafter, a first direction DR1 may be a direction between the X-axis direction and the Y-axis direction (e.g., between the positive X-axis direction and the positive Y-axis direction), and the second direction DR2 may be a direction between an opposite Y-axis direction and the X-axis direction (e.g., between the negative Y-axis direction and the positive X-axis direction). The third direction DR3 may be an opposite direction to the first direction DR1, and a fourth direction DR4 may be an opposite direction to the second direction DR2. Accordingly, each of the plurality of connection electrodes CE may connect corresponding adjacent driving electrodes TE to each other in the Y-axis direction.

Each pixel group PG may include first to third sub-pixels or first to fourth sub-pixels. Each of the first to fourth sub-pixels may include first to fourth emission areas EA1, EA2, EA3, and EA4. For example, the first emission area EA1 may emit light of a first color such as red light, the second emission area EA2 may emit light of a second color such as green light, and the third emission area EA3 may emit light of a third color such as blue light. Further, the fourth emission area EA4 may emit light of a fourth color different from the first through third colors, or may emit light of any suitable one of the first through third colors, but the present disclosure is not limited thereto.

One pixel group PG may express a white gray level (e.g., a white grayscale value) through the first to third emission areas EA1 to EA3, or through the first to fourth emission areas EA1 to EA4. Further, gray levels of various suitable colors, such as white and the like, may be expressed by a combination of the light emitted from the first to third emission areas EA1 to EA3, or the first to fourth emission areas EA1 to EA4.

Depending on an arrangement structure of the first to third sub-pixels or the first to fourth sub-pixels, the plurality of driving electrodes TE, the plurality of sensing electrodes RE, and the plurality of dummy electrodes DE may be formed in a mesh structure or a net structure in a plan view.

The plurality of driving electrodes TE, the plurality of sensing electrodes RE, and the plurality of dummy electrodes DE may surround (e.g., around peripheries of) the spaces between the first to third emission areas EA1 to EA3 or the first to fourth emission areas EA1 to EA4 constituting the pixel group PG and the outer sides thereof in a plan view. Accordingly, the plurality of driving electrodes TE, the plurality of sensing electrodes RE, and the plurality of dummy electrodes DE may not overlap with the first to fourth emission areas EA1 to EA4. The plurality of connection electrodes CE may also not overlap with the first to fourth emission areas EA1 to EA4. Accordingly, the display device 10 may prevent or substantially prevent the luminance of light emitted from the first to fourth emission areas EA1 to EA4 from being reduced by the touch sensing unit TSU.

Each of the plurality of driving electrodes TE may be formed to include a first portion TEa extending in the first direction DR1, and a second portion TEb extending in the second direction DR2, and thus, may not overlap with the first to fourth emission areas EA1 to EA4. Further, each of the plurality of sensing electrodes RE is formed to include a first portion REa extending in the first direction DR1, and a second portion REb extending in the second direction DR2, and thus, may not overlap with the first to fourth emission areas EA1 to EA4. The plurality of dummy electrodes DE are also formed so as not to overlap with the first to fourth emission areas EA1 to EA4.

Figure 7:
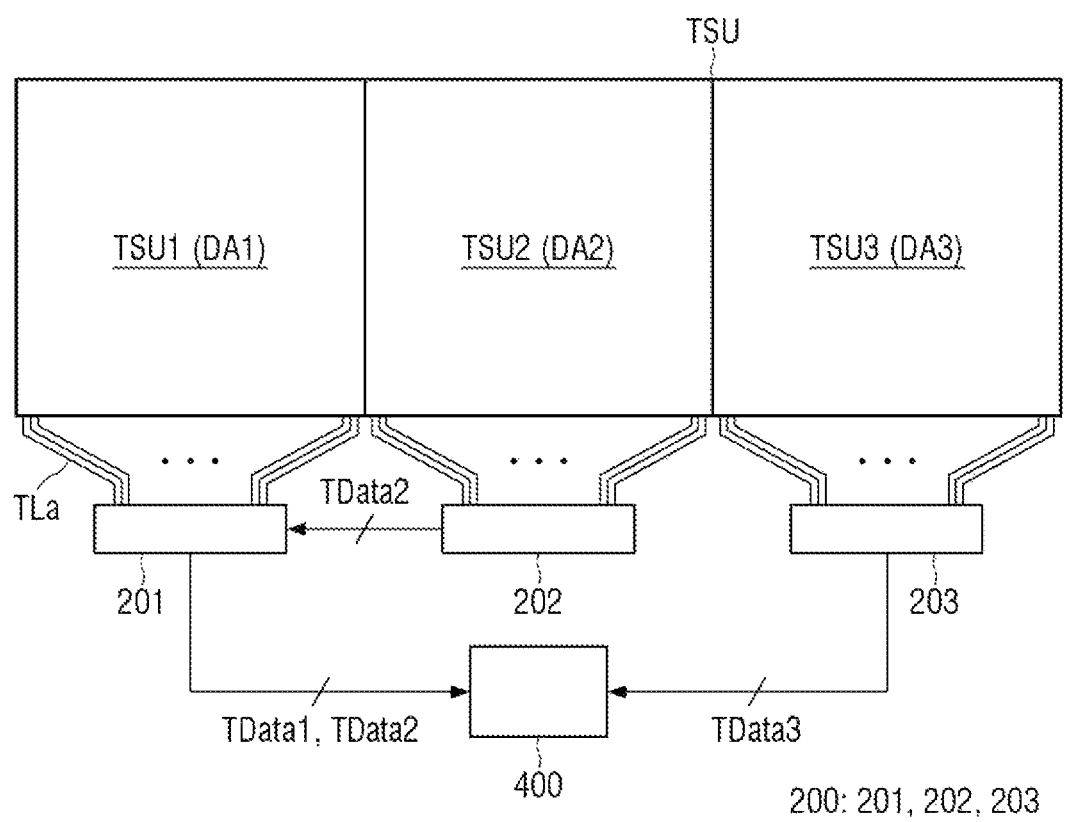
FIG. 7 is a block diagram schematically illustrating a data transmission path between a touch sensing module and a display driving circuit according to an embodiment.

FIG. 7 is a block diagram schematically illustrating a data transmission path between a touch sensing module and a display driving circuit according to an embodiment.

Referring to FIG. 7, the display panel 100 is divided into at least three display areas DA1, DA2, and DA3, so that an image may be displayed through the at least three display areas DA1, DA2, and DA3. In addition, at least three touch sensing areas TSU1, TSU2, and TSU3 overlapping with the at least three display areas DA1, DA2, and DA3 may be distinguished from one another and defined in the display panel 100.

In more detail, the touch sensing unit TSU is formed on the at least three display areas DA1, DA2, and DA3, and the touch sensing unit TSU includes the touch sensing areas TSU1, TSU2, and TSU3. The touch sensing areas TSU1, TSU2, and TSU3 are defined to correspond one-to-one with the display areas DA1, DA2, and DA3, respectively. For example, the touch sensing unit TSU may be divided into the first to third touch sensing areas TSU1, TSU2, and TSU3, so as to correspond one-to-one with the first to third display areas DA1, DA2, and DA3 of the display panel 100, respectively. Further, the first to third touch sensing areas TSU1, TSU2, and TSU3 of the touch sensing unit TSU are arranged or formed in front of the first to third display areas DA1, DA2, and DA3, so as to overlap with the first to third display areas DA1, DA2, and DA3, respectively.

The touch driving circuit 200 may include the plurality of processors 201, 202, and 203. A number of the plurality of processors 201, 202, and 203 may correspond to the number of the display areas DA1, DA2, and DA3, and the number of the touch sensing areas TSU1, TSU2, and TSU3.

For example, the touch driving circuit 200 includes at least one slave processor 202 corresponding to any suitable one of the at least three touch sensing areas TSU1, TSU2, and TSU3, and configured to generate touch coordinate data for the corresponding touch sensing area. In more detail, the touch driving circuit 200 may include a first slave processor 202 that generates touch coordinate data TData2 for the second touch sensing area TSU2 that is between the first and third touch sensing areas TSU1 and TSU3 from among the first to third touch sensing areas TSU1, TSU2, and TSU3.

The first slave processor 202 supplies touch driving signals to the driving electrodes TE of the second touch sensing area TSU2, and measures a change in capacitance of the touch nodes according to a change in a voltage magnitude or a change in a current amount of a touch sensing signal received through the sensing electrodes RE. Accordingly, the first slave processor 202 determines the user's touch position according to a charge variation in a mutual capacitance of each of the touch nodes of the second touch sensing area TSU2, and generates the touch coordinate data TData2 of the second touch sensing area TSU2.

In addition, the touch driving circuit 200 includes a plurality of master processors 201 and 203 that correspond to the touch sensing areas TSU1 and TSU3, respectively, other than the touch sensing area TSU2 corresponding to the at least one first slave processor 202, and are configured to generate touch coordinate data for the corresponding touch sensing areas TSU1 and TSU3, respectively. For example, the touch driving circuit 200 may include a first master processor 201 corresponding to the first touch sensing area TSU1, and configured to generate touch coordinate data of the first touch sensing area TSU1. Further, the touch driving circuit 200 may include a second master processor 203 corresponding to the third touch sensing area TSU3, and configured to generate touch coordinate data of the third touch sensing area TSU3.

The first master processor 201 supplies touch driving signals to the driving electrodes TE of the first touch sensing area TSU1, and receives touch sensing signals through the sensing electrodes RE of the first touch sensing area TSU1 to measure a change in capacitance of the touch nodes. Accordingly, the first master processor 201 determines the user's touch position according to a charge variation in a mutual capacitance of each of the touch nodes of the first touch sensing area TSU1, and generates touch coordinate data TData1 of the first touch sensing area TSU1.

The second master processor 203 supplies touch driving signals to the driving electrodes TE of the third touch sensing area TSU3, and receives touch sensing signals through the sensing electrodes RE of the third touch sensing area TSU3 to measure a change in capacitance of the touch nodes. The second master processor 203 determines the user's touch position according to a charge variation in a mutual capacitance of each of the touch nodes of the third touch sensing area TSU3, and generates touch coordinate data TData3 of the third touch sensing area TSU3.

When a touch of the second touch sensing area TSU2 is detected, the first slave processor 202 determines the user's touch position on the second touch sensing area TSU2, generates the touch coordinate data TData2 of the second touch sensing area TSU2, and transmits the touch coordinate data TData2 to any suitable one (e.g., any preset or predetermined one) of the master processors 201 and 203.

When multiple slave processors are disposed, the first slave processor 202 may transmit the touch coordinate data TData2 of the second touch sensing area TSU2 to another adjacent slave processor, or to the first or second master processor 201 or 203. The first slave processor 202 may send the touch coordinate data transmitted from another adjacent slave processor to still another slave processor, or to either one of the master processors 201 and 203.

As illustrated in FIG. 7, when a touch of the second touch sensing area TSU2 is detected, the first slave processor 202 may transmit the touch coordinate data TData2 of the second touch sensing area TSU2 to the first master processor 201 by a firmware. As another example, when a touch of the second touch sensing area TSU2 is detected, the first slave processor 202 may transmit the touch coordinate data TData2 of the second touch sensing area TSU2 to the second master processor 203 by a firmware.

As another example, the first slave processor 202 may receive an enable signal from one of the first and second master processors 201 and 203, and when the touch of the second touch sensing area TSU2 is detected, the first slave processor 202 may transmit the touch coordinate data TData2 of the second touch sensing area TSU2 to the corresponding master processor from which the enable signal is received. In other words, when the enable signal is supplied from the first master processor 201 from among the first and second master processors 201 and 203, the first slave processor 202 may transmit the touch coordinate data TData2 of the second touch sensing area TSU2 to the first master processor 201 that supplied the enable signal when the touch of the second touch sensing area TSU2 is detected.

In addition, when the touch of the second touch sensing area TSU2 is detected, the first slave processor 202 may continuously transmit the touch coordinate data TData2 of the second touch sensing area TSU2 to one and the same master processor 201 or 203 that transmitted the touch coordinate data TData2 of the second touch sensing area TSU2 (e.g., based on firmware or based on the enable signal) in at least one previous frame period.

When a touch of the first touch sensing area TSU1 is detected, the first master processor 201 generates the touch coordinate data TData1 of the first touch sensing area TSU1, and transmits the touch coordinate data TData1 to the display driving circuit 400.

When the touch coordinate data of the second touch sensing area TSU2 is received from the first slave processor 202, the first master processor 201 transmits the touch coordinate data TData2 of the second touch sensing area TSU2 to the display driving circuit 400.

When the touch coordinate data TData1 of the first touch sensing area TSU1 is generated and the touch coordinate data TData2 of the second touch sensing area TSU2 is received from the first slave processor 202, the first master processor 201 may transmit the touch coordinate data TData1 and the touch coordinate data TData2 to the display driving circuit 400 sequentially, according to an order of priority of being generated or input (e.g., received). For example, in this case, because the touch coordinate data TData1 is first generated, and then the touch coordinate data TData2 is received, the touch coordinate data TData1 may first be provided to the display driving circuit 400, and then the touch coordinate data TData2 may be provided to the display driving circuit 400 after the touch coordinate data TData1.

When the touch coordinate data TData2 of the second touch sensing area TSU2 is received from the first slave processor 202 and the touch coordinate data TData1 of the first touch sensing area TSU1 is generated, the first master processor 201 may transmit the touch coordinate data TData2 of the second touch sensing area TSU2 and the touch coordinate data TData1 of the first touch sensing area TSU1 sequentially to the display driving circuit 400 in the order of priority of being input (e.g., received) or generated. For example, in this case, because the touch coordinate data TData2 is first received, and then the touch coordinate data TData1 is generated, the touch coordinate data TData2 may first be provided to the display driving circuit 400, and then the touch coordinate data TData1 may be provided to the display driving circuit 400 after the touch coordinate data TData2.

Figure 8:
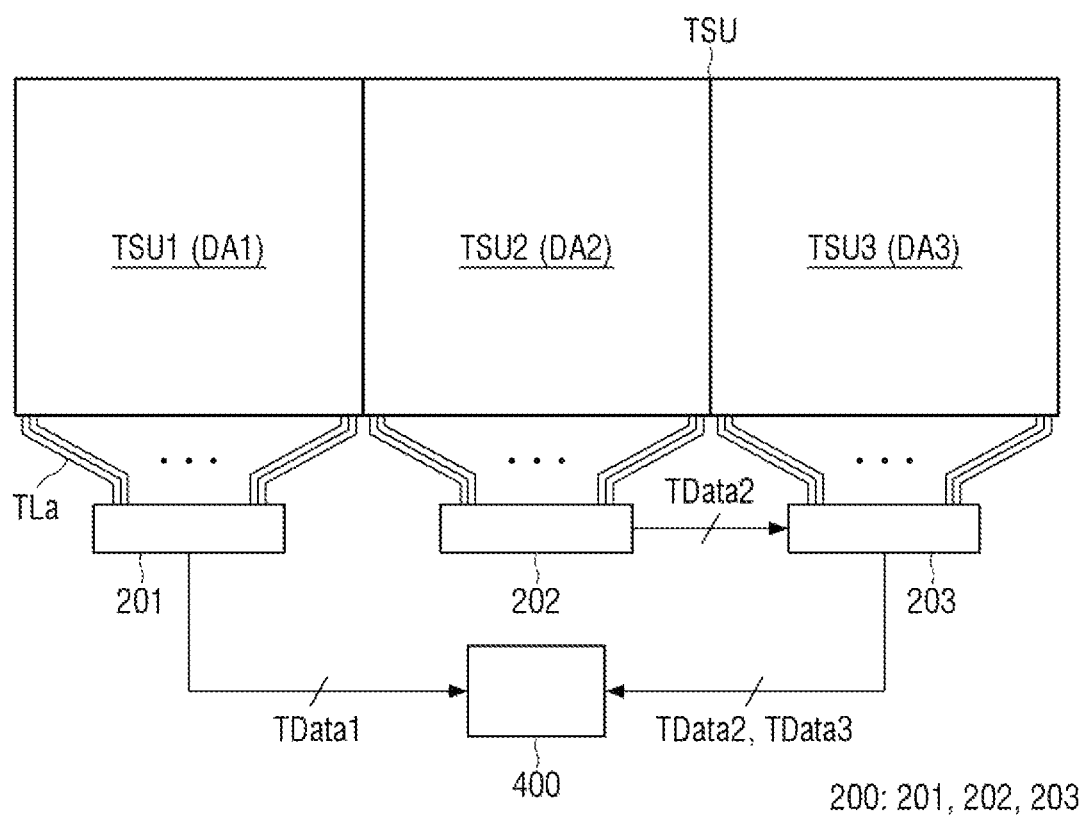
FIG. 8 is a block diagram schematically illustrating a data transmission path between a touch sensing module and a display driving circuit according to an embodiment.

FIG. 8 is a block diagram schematically illustrating a data transmission path between a touch sensing module and a display driving circuit according to an embodiment. For example, the embodiment illustrated in FIG. 8 may be different from that illustrated in FIG. 7.

Referring to FIG. 8, when a touch of the second touch sensing area TSU2 is detected, the first slave processor 202 may transmit the touch coordinate data TData2 of the second touch sensing area TSU2 to the second master processor 203 by a firmware.

As another example, when an enable signal is supplied from the second master processor 203 from among the first and second master processors 201 and 203, the first slave processor 202 may transmit the touch coordinate data TData2 of the second touch sensing area TSU2 to the second master processor 203.

In addition, when the touch of the second touch sensing area TSU2 is detected, the first slave processor 202 may transmit the touch coordinate data TData2 of the second touch sensing area TSU2 to one and the same second master processor 203 that transmitted the touch coordinate data in at least one previous frame period.

When the touch of the third touch sensing area TSU3 is detected, the second master processor 203 generates the touch coordinate data TData3 of the third touch sensing area TSU3, and transmits the touch coordinate data TData3 to the display driving circuit 400.

When the touch coordinate data TData2 of the second touch sensing area TSU2 is received from the first slave processor 202, the second master processor 203 transmits the touch coordinate data TData2 of the second touch sensing area TSU2 to the display driving circuit 400.

When the touch coordinate data TData3 of the third touch sensing area TSU3 is generated and the touch coordinate data TData2 of the second touch sensing area TSU2 is received from the first slave processor 202, the second master processor 203 may transmit the touch coordinate data TData3 of the third touch sensing area TSU3 and the touch coordinate data TData2 of the second touch sensing area TSU2 to the display driving circuit 400 sequentially, according to the order of priority of being generated or input (e.g., received).

When the touch coordinate data TData2 of the second touch sensing area TSU2 is received from the first slave processor 202 and the touch coordinate data TData3 of the third touch sensing area TSU3 is generated, the second master processor 203 may transmit the touch coordinate data TData2 of the second touch sensing area TSU2 and the touch coordinate data TData3 of the third touch sensing area TSU3 to the display driving circuit 400 sequentially in the order of priority of being input (e.g., received) or generated.

Figure 9:
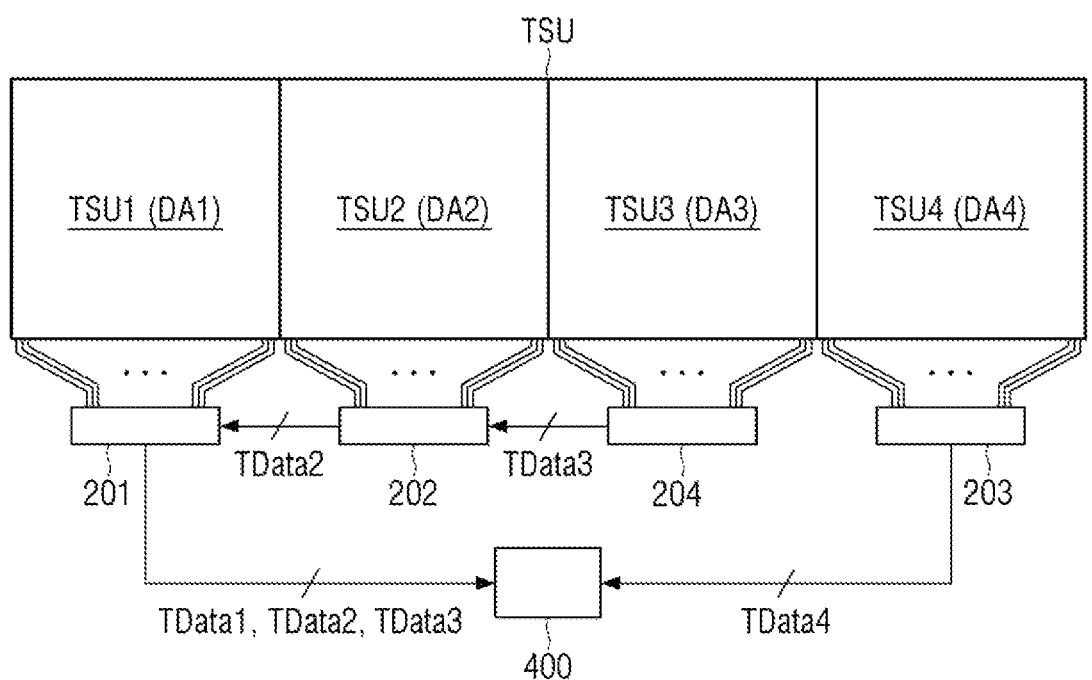
FIG. 9 is a block diagram schematically illustrating a data transmission path between a touch sensing module and a display driving circuit according to an embodiment.
Figure 10:
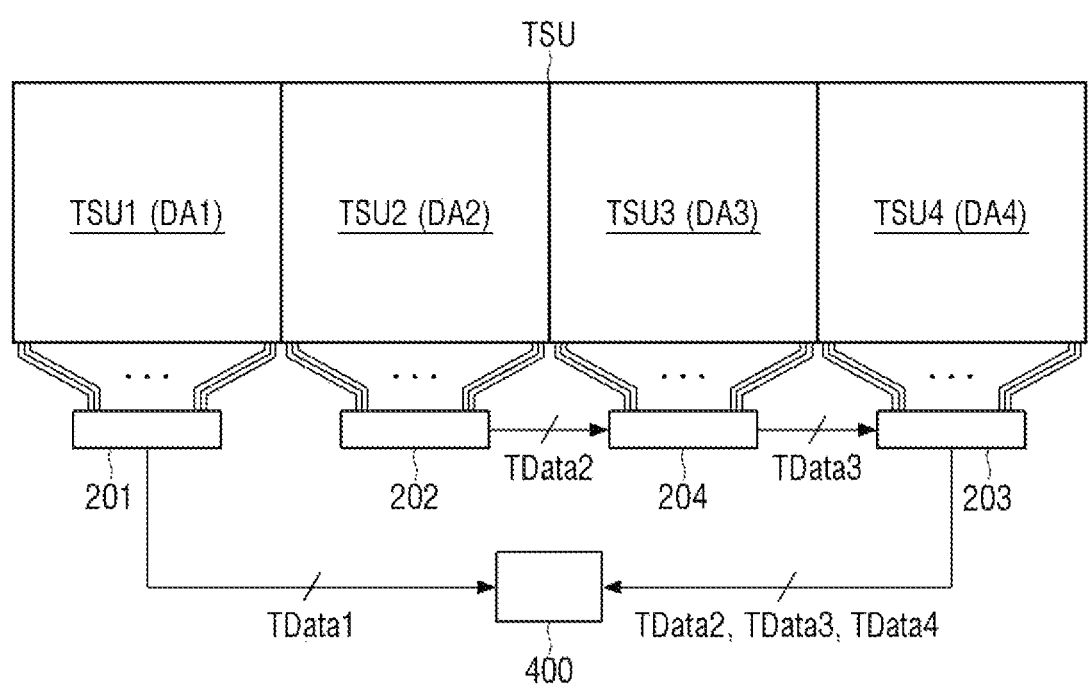
FIG. 10 is a block diagram schematically illustrating a data transmission path between a touch sensing module and a display driving circuit according to an embodiment.

FIG. 9 is a block diagram schematically illustrating a data transmission path between a touch sensing module and a display driving circuit according to an embodiment. FIG. 10 is a block diagram schematically illustrating a data transmission path between a touch sensing module and a display driving circuit according to an embodiment. For example, the embodiment illustrated in FIG. 10 may be different from that illustrated in FIG. 9.

Referring to FIGS. 9 and 10, the display panel 100 may be divided into four display areas DA1, DA2, DA3, and DA4, so that an image may be displayed through the four display areas DA1, DA2, DA3, and DA4. In addition, four touch sensing areas TSU1, TSU2, TSU3, and TSU4 overlapping with the four display areas DA1, DA2, DA3, and DA4 may be distinguished from each other and defined in the display panel 100.

In more detail, the touch sensing unit TSU is formed on the four display areas DA1, DA2, DA3, and DA4, and may include the touch sensing areas TSU1, TSU2, TSU3, and TSU4. The touch sensing areas TSU1, TSU2, TSU3, and TSU4 are defined to correspond one-to-one with the display areas DA1, DA2, DA3, and DA4, respectively. For example, the touch sensing unit TSU may be divided into the first to fourth touch sensing areas TSU1 to TSU4, so as to correspond one-to-one with the first to fourth display areas DA1 to DA4 of the display panel 100, respectively. Further, the first to fourth touch sensing areas TSU1 to TSU4 of the touch sensing unit TSU are arranged or formed in front of the first to fourth display areas DA1 to DA4, so as to overlap with the first to fourth display areas DA1 to DA4, respectively.

As shown in FIG. 9, the touch driving circuit 200 may include a plurality of processors 201, 202, 203, and 204. The plurality of processors 201, 202, 203, and 204 may have a number corresponding to the number of the first to fourth display areas DA1 to DA4, and the number of the first to fourth touch sensing areas TSU1 to TSU4.

For example, the touch driving circuit 200 includes a plurality of slave processors 202 and 204, each of which corresponds to any suitable one of the four touch sensing areas TSU1, TSU2, TSU3, and TSU4, and is configured to generate touch coordinate data for the corresponding touch sensing area. In more detail, the touch driving circuit 200 may include a first slave processor 202 that generates the touch coordinate data TData2 for the second touch sensing area TSU2 between the first and third touch sensing areas TSU1 and TSU3 from among the first to fourth touch sensing areas TSU1 to TSU4. In addition, the touch driving circuit 200 may include a second slave processor 204 that generates the touch coordinate data TData3 for the third touch sensing area TSU3 between the second and fourth touch sensing areas TSU2 and TSU4 from among the first to fourth touch sensing areas TSU1 to TSU4.

The first slave processor 202 supplies touch driving signals to the driving electrodes TE of the second touch sensing area TSU2, and measures a change in capacitance of the touch nodes according to a change in a voltage magnitude or a change in a current amount of a touch sensing signal received through the sensing electrodes RE. Accordingly, the first slave processor 202 determines the user's touch position according to a charge variation in a mutual capacitance of each of the touch nodes of the second touch sensing area TSU2, and generates the touch coordinate data TData2 of the second touch sensing area TSU2.

The second slave processor 204 supplies touch driving signals to the driving electrodes TE of the third touch sensing area TSU3, and measures a change in capacitance of the touch nodes according to a change in a voltage magnitude or a change in a current amount of a touch sensing signal received through the sensing electrodes RE. Accordingly, the second slave processor 204 determines the user's touch position according to a charge variation in a mutual capacitance of each of the touch nodes of the third touch sensing area TSU3, and generates the touch coordinate data TData3 of the third touch sensing area TSU3.

In addition, the touch driving circuit 200 includes a plurality of master processors 201 and 203 that correspond to the touch sensing areas TSU1 and TSU4, respectively, other than those corresponding to the first and second slave processors 202 and 204, and are configured to generate touch coordinate data for the corresponding touch sensing areas TSU1 and TSU4, respectively. For example, the touch driving circuit 200 may include a first master processor 201 corresponding to the first touch sensing area TSU1, and configured to generate the touch coordinate data TData1 of the corresponding first touch sensing area TSU1. Further, the touch driving circuit 200 may include a second master processor 203 corresponding to the fourth touch sensing area TSU4, and configured to generate touch coordinate data TData4 of the corresponding fourth touch sensing area TSU4.

The first master processor 201 determines the user's touch position according to a charge variation in a mutual capacitance of each of the touch nodes of the first touch sensing area TSU1, and generates the touch coordinate data TData1 of the first touch sensing area TSU1.

The second master processor 203 may determine the user's touch position according to a charge variation in a mutual capacitance of each of the touch nodes of the fourth touch sensing area TSU4, and generates the touch coordinate data TData4 of the fourth touch sensing area TSU4.

When a touch of the second touch sensing area TSU2 is detected, the first slave processor 202 generates the touch coordinate data TData2 of the second touch sensing area TSU2, and may transmit the touch coordinate data TData2 to another adjacent slave processor, or to any suitable one (e.g., any preset or predetermined one) of the master processors 201 and 203.

When a touch of the third touch sensing area TSU3 is detected, the second slave processor 204 may generate the touch coordinate data TData3 of the third touch sensing area TSU3, and may transmit the touch coordinate data TData3 to another adjacent slave processor, or to any suitable one (e.g., any preset or predetermined one) of the first and second master processors 201 and 203.

When touch coordinate data is received from another adjacent slave processor, the first and second slave processors 202 and 204 transmit the received touch coordinate data to still another adjacent slave processor or any suitable one (e.g., any preset or predetermined one) of the master processors 201 and 203.

As illustrated in FIG. 9, when the touch of the third touch sensing area TSU3 is detected, the second slave processor 204 may transmit the touch coordinate data TData3 of the third touch sensing area TSU3 to another slave processor, or in other words, to the first slave processor 202 by a firmware.

When the touch of the second touch sensing area TSU2 is detected, the first slave processor 202 may transmit the touch coordinate data TData2 of the second touch sensing area TSU2 to the first master processor 201 by a firmware.

As another example, the first and second slave processors 202 and 204 may receive an enable signal from another adjacent slave processor, or from any one master processor, and may transmit the touch coordinate data TData2 and TData3 to the corresponding slave processor or master processor from which the enable signal is received. For example, when the enable signal is supplied from the first master processor 201, the first slave processor 202 may transmit the touch coordinate data TData2 of the second touch sensing area TSU2 to the first master processor 201 that supplied the enable signal. When the enable signal is supplied from the first slave processor 202, the second slave processor 204 may transmit the touch coordinate data TData3 to the first slave processor 202 that supplied the enable signal.

Furthermore, the first and second slave processors 202 and 204 may continuously transmit the touch coordinate data of their corresponding individual areas (e.g., touch sensing areas) to one and the same master or slave processor that transmitted the touch coordinate data in at least one previous frame period.

When the touch coordinate data is received from another adjacent slave processor, each of the first and second slave processors 202 and 204 may deliver the received touch coordinate data to another adjacent master processor.

When the first master processor 201 generates the touch coordinate data TData1 of the first touch sensing area TSU1 and transmits the touch coordinate data TData1 to the display driving circuit 400, and when the touch coordinate data TData2 and TData3 of the second and third touch sensing areas TSU2 and TSU3 are received from the first slave processor 202, the first master processor 201 sequentially transmits the received touch coordinate data to the display driving circuit 400.

When the touch coordinate data TData1 of the first touch sensing area TSU1 is generated and the touch coordinate data TData2 and TData3 are sequentially received from the other adjacent slave processors 202 and 204, the first master processor 201 may transmit the touch coordinate data TData2 and TData3 to the display driving circuit 400 sequentially according to the order of priority of being generated or input (e.g., received).

When the touch coordinate data TData2 and TData3 of the second and third touch sensing areas TSU2 and TSU3 are sequentially received from the first slave processor 202, and the touch coordinate data TData1 of the first touch sensing area TSU1 is generated, the first master processor 201 may transmit the touch coordinate data TData2 and TData3 of the second and third touch sensing areas TSU2 and TSU3 and the touch coordinate data TData1 of the first touch sensing area TSU1 sequentially to the display driving circuit 400 according to the order of priority of being input (e.g., received) or generated.

Referring to FIG. 10, the first and second slave processors 202 and 204 may transmit the touch coordinate data TData2 and TData3 to another adjacent slave processor or to the second master processor 203 by a firmware.

For example, when an enable signal is supplied from the second slave processor 204, the first slave processor 202 may transmit the touch coordinate data TData2 of the second touch sensing area TSU2 to the second slave processor 204.

The second slave processor 204 may transmit the touch coordinate data TData3 of the third touch sensing area TSU3 to another and the same slave processor that transmitted the touch coordinate data in at least one previous frame period, or to the second master processor 203.

When the touch of the fourth touch sensing area TSU4 is detected, the second master processor 203 generates the touch coordinate data TData4 of the fourth touch sensing area TSU4, and transmits the touch coordinate data TData4 to the display driving circuit 400.

When the touch coordinate data TData2 and TData3 of the second and third touch sensing areas TSU2 and TSU3 are received through the first and second slave processors 202 and 204, the second master processor 203 sequentially transmits the touch coordinate data TData2 and TData3 of the second and third touch sensing areas TSU2 to the display driving circuit 400.

When the touch coordinate data TData4 of the fourth touch sensing area TSU4 is generated, and the touch coordinate data TData2 and TData3 of the second and third touch sensing areas TSU2 and TSU3 are received from the first and second slave processors 202 and 204, the second master processor 203 may sequentially transmit the touch coordinate data TData4 of the fourth touch sensing area TSU4 and the touch coordinate data TData2 and TData3 of the second and third touch sensing areas TSU2 and TSU3 to the display driving circuit 400 according to the order of priority of being generated or input (e.g., received).

On the other hand, when the touch coordinate data TData2 and TData3 of the second and third touch sensing areas TSU2 and TSU3 are sequentially received through the first and second slave processors 202 and 204, and the touch coordinate data TData4 of the fourth touch sensing area TSU4 is generated, the second master processor 203 may transmit the touch coordinate data TData2 and TData3 of the second and third touch sensing areas TSU2 and TSU3 and the touch coordinate data TData4 of the fourth touch sensing area TSU4 to the display driving circuit 400 sequentially in the order of the touch coordinate data TData2 and TData4 and the touch coordinate data TData4 according to the order of priority of being input (e.g., received) or generated.

Figure 11:
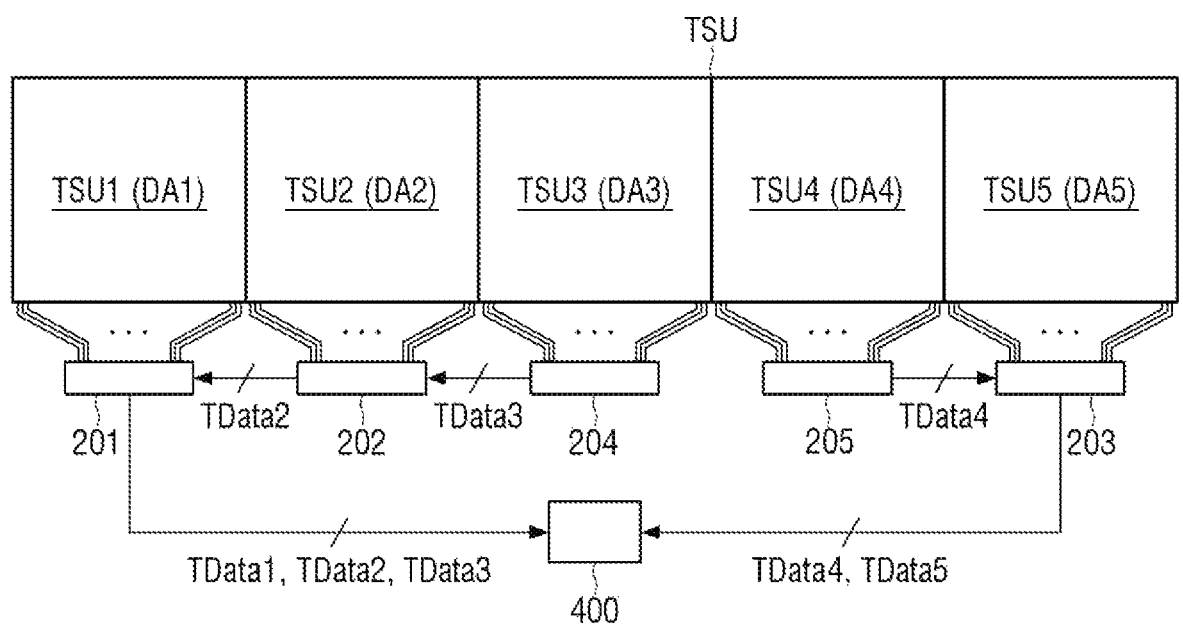
FIG. 11 is a block diagram schematically illustrating a data transmission path between a touch sensing module and a display driving circuit according to an embodiment.
Figure 12:
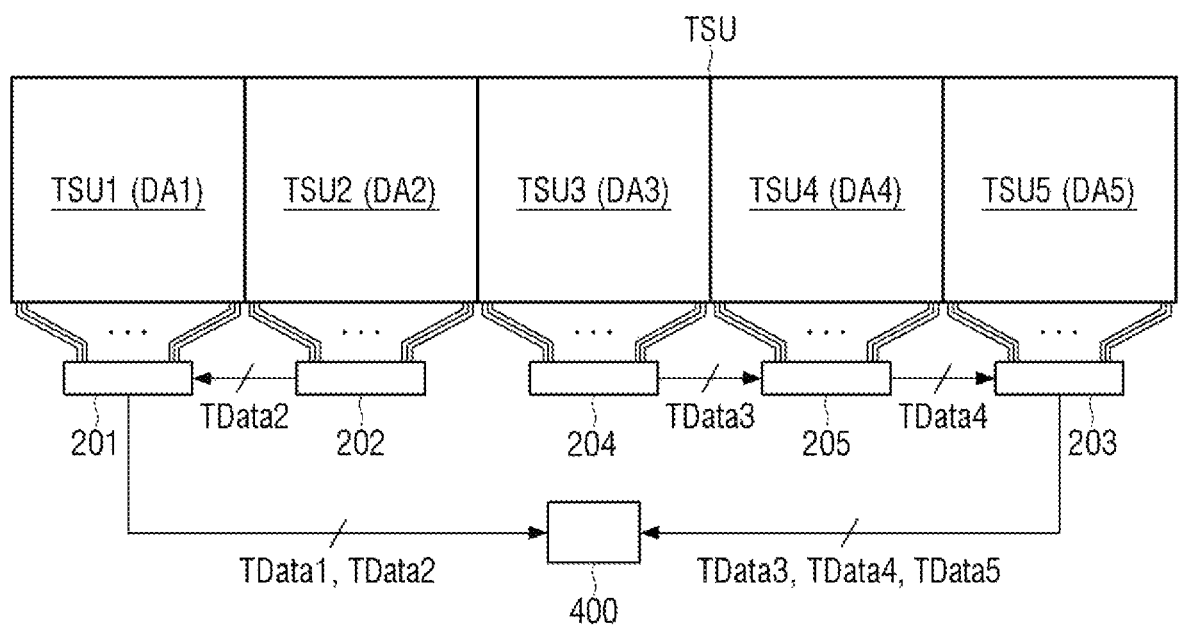
FIG. 12 is a block diagram schematically illustrating a data transmission path between a touch sensing module and a display driving circuit according to an embodiment.

FIG. 11 is a block diagram schematically illustrating a data transmission path between a touch sensing module and a display driving circuit according to an embodiment. FIG. 12 is a block diagram schematically illustrating a data transmission path between a touch sensing module and a display driving circuit according to an embodiment. The embodiment illustrated in FIG. 12 may be different from that illustrated in FIG. 11.

Referring to FIGS. 11 and 12, the display panel 100 may be divided into five display areas DA1, DA2, DA3, DA4, and DA5, so that an image may be displayed through the five display areas DA1, DA2, DA3, DA4, and DA5. In addition, five touch sensing areas TSU1, TSU2, TSU3, TSU4, and TSU5 overlapping with the five display areas DA1, DA2, DA3, DA4, and DA5 may be distinguished from each other and defined in the display panel 100.

In more detail, the touch sensing unit TSU is formed on the five display areas DA1, DA2, DA3, DA4, and DA5, and includes the five touch sensing areas TSU1, TSU2, TSU3, TSU4, and TSU5. The five touch sensing areas TSU1, TSU2, TSU3, TSU4, and TSU5 are defined to correspond one-to-one with the five display areas DA1, DA2, DA3, DA4, and DA5, respectively. For example, the touch sensing unit TSU may be divided into the first to fifth touch sensing areas TSU1 to TSU5, so as to correspond one-to-one with the first to fifth display areas DA1 to DA5 of the display panel 100, respectively. In addition, the first to fifth touch sensing areas TSU1 to TSU5 of the touch sensing unit TSU are arranged or formed in front of the first to fifth display areas DA1 to DA5, so as to overlap with the first to fifth display areas DA1 to DA5, respectively.

As shown in FIG. 11, the touch driving circuit 200 may include a plurality of processors 201, 202, 203, 204, and 205. The plurality of processors 201, 202, 203, 204, and 205 may have a number corresponding to the number of the first to fifth display areas DA1 to DA5, and the number of the first to fifth touch sensing areas TSU1 to TSU5.

For example, the touch driving circuit 200 includes a plurality of slave processors 202, 204 and 205, each of which corresponds to any suitable one of the touch sensing areas TSU1, TSU2, TSU3, TSU4, and TSU5, and is configured to generate touch coordinate data for the corresponding touch sensing area. In more detail, the touch driving circuit 200 may include the first slave processor 202 that generates the touch coordinate data TData2 for the second touch sensing area TSU2 between the first and third touch sensing areas TSU1 and TSU3 from among the first to fifth touch sensing areas TSU1 to TSU5. Further, the touch driving circuit 200 may include the second slave processor 204 that generates the touch coordinate data TData3 for the third touch sensing area TSU3 between the second and fourth touch sensing areas TSU2 and TSU4 from among the first to fifth touch sensing areas TSU1 to TSU5. In addition, the touch driving circuit 200 may include the third slave processor 205 that generates touch coordinate data TData4 for the fourth touch sensing area TSU4 between the third and fifth touch sensing areas TSU3 and TSU5 from among the first to fifth touch sensing areas TSU1 to TSU5.

The first slave processor 202 determines the user's touch position according to a charge variation in a mutual capacitance of each of the touch nodes of the second touch sensing area TSU2, and generates the touch coordinate data TData2 of the second touch sensing area TSU2.

The second slave processor 204 determines the user's touch position according to a charge variation in a mutual capacitance of each of the touch nodes of the third touch sensing area TSU3, and generates the touch coordinate data TData3 of the third touch sensing area TSU3.

The third slave processor 205 determines the user's touch position according to a charge variation in a mutual capacitance of each of the touch nodes of the fourth touch sensing area TSU4, and generates the touch coordinate data TData4 of the fourth touch sensing area TSU4.

In addition, the touch driving circuit 200 includes a plurality of master processors 201 and 203 that correspond to the touch sensing areas TSU1 and TSU5, respectively, other than those corresponding to the first to third slave processors 202 to 205, and are configured to generate touch coordinate data for the corresponding touch sensing areas TSU1 and TSU5, respectively. For example, the touch driving circuit 200 may include the first master processor 201 corresponding to the first touch sensing area TSU1, and configured to generate the touch coordinate data TData1 of the corresponding first touch sensing area TSU. Further, the touch driving circuit 200 may include the second master processor 203 corresponding to the fifth touch sensing area TSU5, and configured to generate touch coordinate data TData5 of the corresponding fifth touch sensing area TSU5.

The first master processor 201 determines the user's touch position according to a charge variation in a mutual capacitance of each of the touch nodes of the first touch sensing area TSU1, and generates the touch coordinate data TData1 of the first touch sensing area TSU1.

The second master processor 203 may determine the user's touch position according to a charge variation in a mutual capacitance of each of the touch nodes of the fifth touch sensing area TSU4, and generate the touch coordinate data TData5 of the fifth touch sensing area TSU5.

When a touch of the second touch sensing area TSU2 is detected, the first slave processor 202 generates the touch coordinate data TData2 of the second touch sensing area TSU2, and transmits the touch coordinate data TData2 to another adjacent slave processor or the adjacent first master processor 201.

When a touch of the third touch sensing area TSU3 is detected, the second slave processor 204 generates the touch coordinate data TData3 of the third touch sensing area TSU3, and transmits the touch coordinate data TData3 to the adjacent first slave processor 202 or the adjacent first master processor 201.

When a touch of the fourth touch sensing area TSU4 is detected, the third slave processor 205 generates the touch coordinate data TData4 of the fourth touch sensing area TSU4, and transmits the touch coordinate data TData4 to the adjacent second slave processor 204 or the adjacent second master processor 203.

When touch coordinate data is received from another adjacent slave processor, the first to third slave processors 202, 204, and 205 transmit the received touch coordinate data to still another adjacent slave processor, or to any suitable one (e.g., any preset or predetermined one) of the first and second master processors 201 and 203.

As illustrated in FIG. 11, when the touch of the touch sensing area TSU3 is detected, the second slave processor 204 may transmit the touch coordinate data TData3 of the third touch sensing area TSU3 to the first slave processor 202 by a firmware.

When the touch of the second touch sensing area TSU2 is detected, the first slave processor 202 may transmit the touch coordinate data TData2 of the second touch sensing area TSU2 to the first master processor 201 by a firmware.

As another example, the first and second slave processors 202 and 204 may receive an enable signal from another adjacent slave processor or any suitable one master processor, and transmit the touch coordinate data TData2 and TData3 to the corresponding slave processor or the master processor from which the enable signal is received. For example, when the enable signal is supplied from the first master processor 201, the first slave processor 202 may transmit the touch coordinate data TData2 of the second touch sensing area TSU2 to the first master processor 201 that supplied the enable signal. On the other hand, when the enable signal is supplied from the first slave processor 202, the second slave processor 204 may transmit the touch coordinate data TData3 to the first slave processor 202 that supplied the enable signal.

In addition, the first and second slave processors 202 and 204 may continuously transmit the touch coordinate data of the individual areas (e.g., the touch sensing areas) to one and the same master processor or slave processor that transmitted the touch coordinate data in at least one previous frame period.

When touch coordinate data is received from other adjacent slave processors, each of the first and second slave processors 202 and 204 may transmit touch coordinate data from the other slave processors to other adjacent master processors.

The first master processor 201 generates the touch coordinate data TData1 of the first touch sensing area TSU1, and transmits the touch coordinate data TData1 to the display driving circuit 400, and when the touch coordinate data TData2 and TData3 of the second and third touch sensing areas TSU2 and TSU3 are received from the first slave processor 202, the first master processor 201 transmits the touch coordinate data TData2 and TData3 to the display driving circuit 400 sequentially.

When the touch coordinate data TData1 of the first touch sensing area TSU1 is generated, and the touch coordinate data TData2 and TData3 are sequentially received from the other adjacent slave processors 202 and 204, the first master processor 201 may transmit the touch coordinate data TData1 and the touch coordinate data TData2 and TData3 sequentially to the display driving circuit 400 according to the order of priority of being generated or input (e.g., received).

When the touch coordinate data TData2 and TData3 of the second and third touch sensing areas TSU2 and TSU3 are sequentially received from the first slave processor 202, and the touch coordinate data TData1 of the first touch sensing area TSU1 is generated, the first master processor 201 may transmit the touch coordinate data TData2 and TData3 of the second and third sensing areas TSU2 and TSU3 and the touch coordinate data TData1 of the first touch sensing area TSU1 sequentially to the display driving circuit 400 according to the order of priority of being input (e.g., received) or generated.

When the touch of the fourth touch sensing area TSU4 is detected, the third slave processor 205 may transmit the touch coordinate data TData4 of the fourth touch sensing area TSU4 to another slave processor or to the second master processor 203 by a firmware.

Referring to FIG. 12, the second and third slave processors 204 and 205 may transmit the touch coordinate data TData2 and TData3 to another adjacent slave processor or to the second master processor 203 by a firmware.

For example, when an enable signal is supplied from the third slave processor 205, the second slave processor 204 may transmit the touch coordinate data TData2 of the second touch sensing area TSU2 to the third slave processor 205.

The second slave processor 204 may transmit the touch coordinate data TData3 of the third touch sensing area TSU3 to another and the same slave processor that transmitted the touch coordinate data in at least one previous frame period, or to the second master processor 203.

When the touch of the fifth touch sensing area TSU5 is detected, the second master processor 203 generates the touch coordinate data TData5 of the fifth touch sensing area TSU5, and transmits the touch coordinate data TData5 to the display driving circuit 400.

When the touch coordinate data TData3 and TData4 of the third and fourth touch sensing areas TSU3 and TSU4 are received through the second and third slave processors 204 and 205, the second master processor 203 sequentially transmits the touch coordinate data TData3 and TData4 of the third and fourth touch sensing areas TSU3 and TSU4 to the display driving circuit 400.

When the touch coordinate data TData5 of the fifth touch sensing area TSU5 is generated, and the touch coordinate data TData3 and TData4 of the third and fourth touch sensing areas TSU3 and TSU4 are received from the second and third slave processors 204 and 205, the second master processor 203 may transmit the touch coordinate data TData5 of the fifth touch sensing area TSU5 and the touch coordinate data TData3 and TData4 of the third and fourth touch sensing areas TSU3 and TSU4 sequentially to the display driving circuit 400 according to the order of priority of being generated or input (e.g., received).

On the other hand, when the touch coordinate data TData3 and TData4 of the third and fourth touch sensing areas TSU3 and TSU4 are sequentially received through the second and third slave processors 204 and 205, and the touch coordinate data TData5 of the fifth touch sensing area TSU5 is generated, the second master processor 203 may transmit the touch coordinate data TData3 and TData4 of the third and fourth touch sensing areas TSU3 and TSU4 and the touch coordinate data TData5 of the fifth touch sensing area TSU5 sequentially to the display driving circuit 400 according to the order of priority of being input (e.g., received) or generated.

Figure 13:
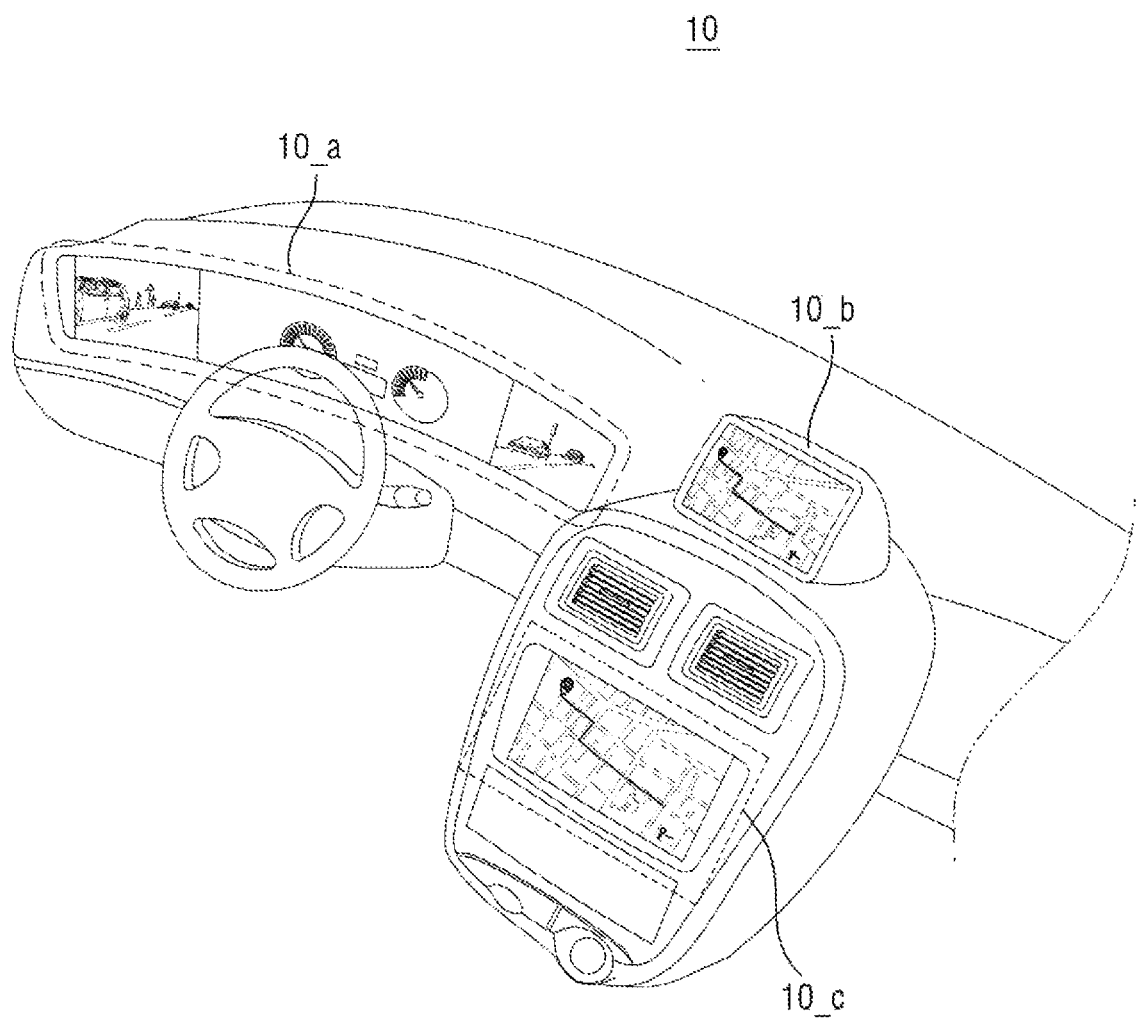
FIG. 13 is a perspective view illustrating a dashboard and a center fascia of an automobile including a display device according to an embodiment.

FIG. 13 is a perspective view illustrating a dashboard and a center fascia of an automobile including a display device according to an embodiment.

FIG. 13 illustrates an automobile including automobile display devices 10_a, 10_b, and 10_c according to an embodiment. A first automobile display device 10_a according to an embodiment may be applied to a dashboard of the automobile, and/or a second automobile display device 10_b according to an embodiment may be applied to a center fascia of the automobile. In addition, a third automobile display device 10_c according to an embodiment may be applied to a center information display (CID) disposed on the dashboard of the automobile. According to an embodiment, automobile display devices may be applied to a room mirror display that replaces a side mirror of the automobile.

Figure 14:
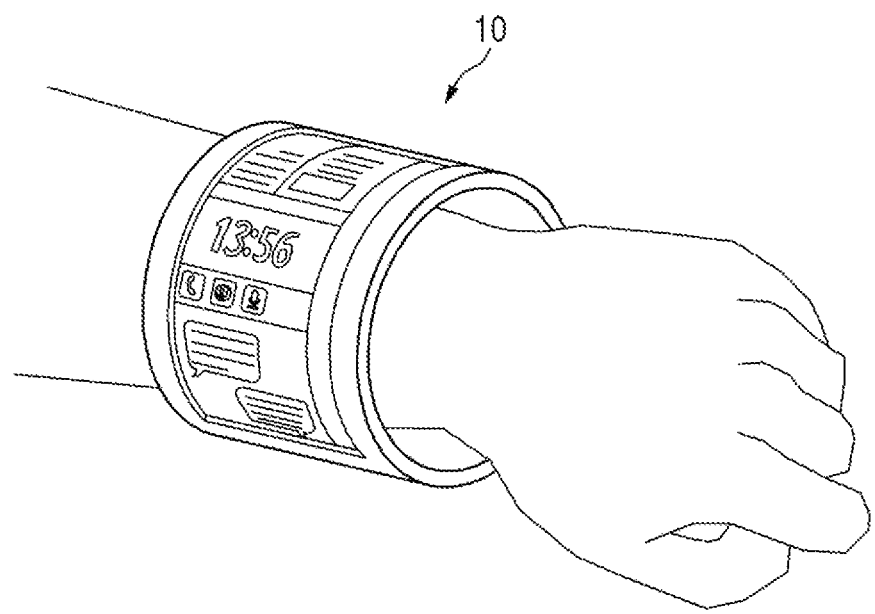
FIG. 14 is a perspective view illustrating a rollable display device according to an embodiment.
Figure 15:
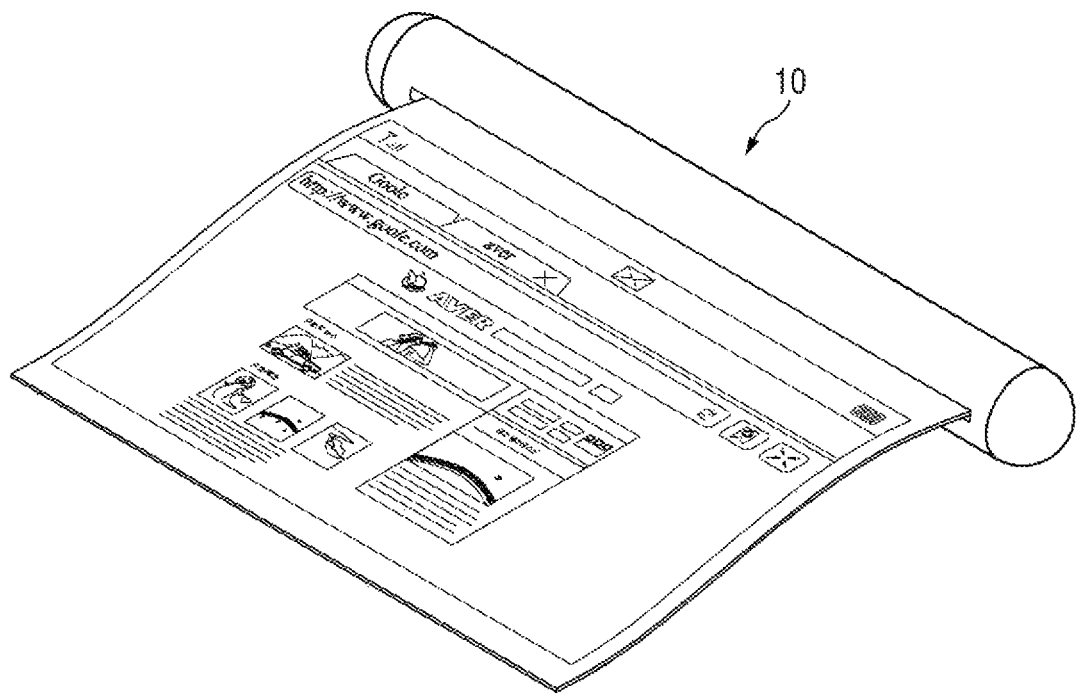
FIG. 15 is a perspective view illustrating a rollable display device according an embodiment.

FIG. 14 is a perspective view illustrating a rollable display device according to an embodiment. FIG. 15 is a perspective view illustrating a rollable display device according to an embodiment.

Referring to FIGS. 14 and 15, the display device 10 according to one or more embodiments may be applied as a display unit (e.g., a display or a display screen) of a portable electronic device, such as a tablet personal computer (pc), a mobile communication terminal, an electronic notebook, an electronic book, and an ultra mobile PC (UMPC). For example, as illustrated in FIG. 14, the display device according to an embodiment may be allowed to a wearable display device 10. In addition, the display device 10 according to an embodiment may be used as a rollable display device 10. The display panel 100 of the rollable display device 10 may be rolled while being bent in the X-axis direction or the Y-axis direction.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A touch sensor comprising:
a display panel configured to display an image, and comprising at least three touch sensing areas;
at least one slave processor connected to a second touch sensing area from among the at least three touch sensing areas, and configured to generate touch coordinate data for the second touch sensing area; and
a plurality of master processors connected to first and third touch sensing areas from among the at least three touch sensing areas, and configured to generate touch coordinate data for the first and third touch sensing areas, respectively,
wherein the at least one slave processor is configured to transmit the touch coordinate data for at least the second touch sensing area to any one of the plurality of master processors, or to another adjacent slave processor, and
wherein the plurality of master processors are connected to a display driving circuit through separate data transmission paths from each other to transmit at least the touch coordinate data for the first and third touch sensing areas to the display driving circuit through the separate data transmission paths, respectively.

2. The touch sensor of claim 1, wherein at least one of the plurality of master processors is configured to sequentially transmit the touch coordinate data received from the at least one slave processor and the touch coordinate data for the first or third touch sensing areas to the display driving circuit according to an order of priority.

3. The touch sensor of claim 2, wherein the at least one slave processor is configured to receive touch coordinate data from another slave processor, and transmit the touch coordinate data received from the another slave processor to the any one of the plurality of master processors, or to the another adjacent slave processor.

4. The touch sensor of claim 1, wherein the first, second, and third touch sensing areas correspond one-to-one to first, second, and third display areas of the display panel, respectively, and
wherein a first slave processor from among the at least one slave processor is configured to generate the touch coordinate data for the second touch sensing area, the second touch sensing area being located between the first and third touch sensing areas from among the at least three touch sensing areas.

5. The touch sensor of claim 4, wherein a first master processor from among the plurality of master processors is configured to generate the touch coordinate data of the first touch sensing area, and transmit the generated touch coordinate data of the first touch sensing area to the display driving circuit, and
wherein a second master processor from among the plurality of master processors is configured to generate the touch coordinate data of the third touch sensing area, and transmit the generated touch coordinate data of the third touch sensing area to the display driving circuit.

6. The touch sensor of claim 5, wherein the first slave processor is configured to transmit the touch coordinate data of the second touch sensing area to one of the first or second master processors according to firmware, and
wherein the one of the first or second master processors is configured to transmit the touch coordinate data received from the first slave processor to the display driving circuit according to an order of priority.

7. The touch sensor of claim 5, wherein the first slave processor is configured to receive an enable signal from any one of the first or second master processors, and transmit the touch coordinate data of the second touch sensing area to the any one of the first or second master processors in response to the enable signal, and
wherein the any one of the first or second master processors is configured to transmit the touch coordinate data received from the first slave processor to the display driving circuit according to an order of priority.

8. The touch sensor of claim 5, wherein the first slave processor is configured to transmit the touch coordinate data of the second touch sensing area to one of the first or second master processors based on the one of the first or second master processors that transmitted touch coordinate data in at least one previous frame period, and
wherein the one of the first or second master processors is configured to transmit the touch coordinate data received from the first slave processor to the display driving circuit according to an order of priority.

9. A touch sensor comprising:
a display panel configured to display an image, and comprising at least three touch sensing areas;
at least one slave processor connected to a second touch sensing area from among the at least three touch sensing areas, and configured to generate touch coordinate data for the second touch sensing area; and
a plurality of master processors connected to first and third touch sensing areas from among the at least three touch sensing areas, and configured to generate touch coordinate data for the first and third touch sensing areas, respectively,
wherein the at least one slave processor is configured to transmit the touch coordinate data for at least the second touch sensing area to any one of the plurality of master processors, or to another adjacent slave processor,
wherein the at least three touch sensing areas further comprise a fourth touch sensing area,
wherein the first, second, third, and fourth touch sensing areas correspond one-to-one to first, second, third, and fourth display areas of the display panel, respectively,
wherein a first slave processor from among the at least one slave processor is configured to generate the touch coordinate data for the second touch sensing area, the second touch sensing area being located between the first and fourth touch sensing areas from among the first to fourth touch sensing areas, and wherein a second slave processor from among the at least one slave processor is configured to generate touch coordinate data for the fourth touch sensing area, the fourth touch sensing area being located between the second and third touch sensing areas among the first to fourth touch sensing areas.

10. The touch sensor of claim 9, wherein a first master processor from among the plurality of master processors is configured to generate the touch coordinate data of the first touch sensing area, and transmit the generated touch coordinate data of the first touch sensing area to a display driving circuit, and wherein a second master processor from among the plurality of master processors is configured to generate the touch coordinate data of the third touch sensing area, and transmit the generated touch coordinate data of the third touch sensing area to the display driving circuit.

11. The touch sensor of claim 10, wherein the first slave processor is configured to transmit the touch coordinate data of the second touch sensing area to the first master processor or the second slave processor according to a firmware, wherein the second slave processor is configured to transmit the touch coordinate data of the fourth touch sensing area to the second master processor or the first slave processor according to firmware, and wherein the first and second slave processors are configured to transmit touch coordinate data received from an adjacent slave processor to one of the first or second master processors according to firmware.

12. The touch sensor of claim 11, wherein the first and second master processors are configured to transmit touch coordinate data sequentially transmitted and received from at least one of the first or second slave processors to the display driving circuit according to an order of priority.

13. The touch sensor of claim 10, wherein the first slave processor is configured to receive an enable signal from any one of the first master processor, the second master processor, or the second slave processor, and transmit the touch coordinate data to the first master processor, the second master processor, or the second slave processor in response to the enable signal from the any one of the first master processor, the second master processor, or the second slave processor, wherein the second slave processor is configured to receive an enable signal from any one of the first master processor, the second master processor, or the first slave processor, and transmit the touch coordinate data to the first master processor, the second master processor, or the first slave processor in response to the enable signal from the any one of the first master processor, the second master processor, or the first slave processor, and wherein the first and second master processors are configured to transmit the touch coordinate data received from at least one of the first or second slave processors to the display driving circuit according to an order of priority.

14. The touch sensor of claim 10, wherein the first slave processor is configured to transmit the touch coordinate data of the second touch sensing area to the second slave processor, or one of the first or second master processors that transmitted touch coordinate data in at least one previous frame period, wherein the second slave processor is configured to transmit the touch coordinate data of the fourth touch sensing area to the first slave processor, or one of the first or second master processors that transmitted touch coordinate data in at least one previous frame period, and wherein the first and second master processors are configured to transmit touch coordinate data received from at least one of the first or second slave processors to the display driving circuit according to an order of priority.

15. The touch sensor of claim 1, wherein the at least three touch sensing areas further comprises fourth and fifth touch sensing areas, the first to fifth touch sensing areas corresponding one-to-one to first, second, third, fourth, and fifth display areas of the display panel, respectively, wherein a first slave processor from among the at least one slave processor is configured to generate the touch coordinate data for the second touch sensing area, the second touch sensing area being located between the first and fourth touch sensing areas from among the first to fifth touch sensing areas, wherein a second slave processor from among the at least one slave processor is configured to generate touch coordinate data for the fourth touch sensing area, the fourth touch sensing area being located between the second and fifth touch sensing areas from among the first to fifth touch sensing areas, and wherein a third slave processor from among the at least one slave processor is configured to generate touch coordinate data for the fifth touch sensing area, the fifth touch sensing area being located between the fourth and third touch sensing areas among the first to fifth touch sensing areas.

16. The touch sensor of claim 15, wherein a first master processor from among the plurality of master processors is configured to generate the touch coordinate data of the first touch sensing area, and transmit the generated touch coordinate data of the first touch sensing area to the display driving circuit, and wherein a second master processor from among the plurality of master processors is configured to generate the touch coordinate data of the third touch sensing area, and transmit the generated touch coordinate data of the third touch sensing area to the display driving circuit.

17. The touch sensor of claim 16, wherein the first slave processor is configured to transmit the touch coordinate data of the second touch sensing area to the first master processor or the second slave processor according to a firmware, wherein the second slave processor is configured to transmit the touch coordinate data of the fourth touch sensing area to the first slave processor or the third slave processor according to a firmware, wherein the third slave processor is configured to transmit the touch coordinate data of the fifth touch sensing area to the second master processor or the second slave processor according to firmware, and wherein the first to third slave processors are configured to transmit touch coordinate data received from an adjacent slave processor to another adjacent slave processor, or one of the first or second master processors according to firmware.

18. The touch sensor of claim 17, wherein the first and second master processors are configured to transmit the touch coordinate data sequentially transmitted and received from at least one of the first or second slave processors to the display driving circuit according to an order of priority.

19. The touch sensor of claim 16, wherein the first slave processor is configured to receive an enable signal from the first master processor or the second slave processor, and transmit the touch coordinate data to the second slave processor or the first master processor according to the enable signal from the first master processor or the second slave processor, wherein the second slave processor is configured to receive an enable signal from any one of the first or third slave processors, and transmit the touch coordinate data to the any one of the first or third slave processors according to the enable signal from the any one of the first or third slave processors, wherein the third slave processor is configured to receive an enable signal from the second slave processor or the second master processor, and transmit the touch coordinate data to the second master processor or the second slave processor according to the enable signal from the second slave processor or the second master processor, and wherein the first and second master processors are configured to transmit touch coordinate data received from at least one of the first to third slave processors to the display driving circuit according to an order of priority.

20. A display device comprising:

a display panel comprising at least three display areas on a substrate;

a display driving circuit configured to drive sub-pixels included in the at least three display areas to display an image; and a touch sensor at a front face of the display panel, and comprising at least three touch sensing areas to detect a touch, wherein the touch sensor comprises:

at least one slave processor connected to one of the at least three touch sensing areas, and configured to generate touch coordinate data for the one of the at least three touch sensing areas; and a plurality of master processors connected to two of the at least three touch sensing areas other than the one of the at least three touch sensing areas connected to the at least one slave processor, and configured to generate touch coordinate data for the two of the at least three touch sensing areas, respectively, wherein the at least one slave processor is configured to transmit the touch coordinate data for at least the one of the at least three touch sensing areas to any one of the plurality of master processors, and wherein the plurality of master processors are configured to sequentially transmit the touch coordinate data received from the at least one slave processor and the touch coordinate data for the two of the at least three touch sensing areas to the display driving circuit.

* * * * *